(12) United States Patent
Pabbisetty et al.

(10) Patent No.: US 11,678,286 B2
(45) Date of Patent: Jun. 13, 2023

(54) ELECTRONIC APPARATUS, SYSTEM, AND METHOD

(71) Applicant: KABUSHIKI KAISHA TOSHIBA, Tokyo (JP)

(72) Inventors: Gurusanthosh Pabbisetty, Kawasaki Kanagawa (JP); Tazuko Tomioka, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 107 days.

(21) Appl. No.: 17/187,905

(22) Filed: Mar. 1, 2021

(65) Prior Publication Data

US 2022/0086778 A1 Mar. 17, 2022

(30) Foreign Application Priority Data

Sep. 16, 2020 (JP) .............................. JP2020-155292

(51) Int. Cl.
*H04W 56/00* (2009.01)
(52) U.S. Cl.
CPC ....... *H04W 56/004* (2013.01); *H04W 56/001* (2013.01)
(58) Field of Classification Search
CPC .......................... H04W 56/004; H04W 56/001
See application file for complete search history.

(56) References Cited

U.S. PATENT DOCUMENTS

| 11,411,686 | B2* | 8/2022 | Hong | .................... | H04L 5/0055 |
| 2012/0250738 | A1* | 10/2012 | Shako | .................. | H04W 56/00 |
| | | | | | 375/219 |
| 2014/0207879 | A1* | 7/2014 | Tu | .......................... | H04W 56/00 |
| | | | | | 709/206 |
| 2015/0009875 | A1* | 1/2015 | Khoryaev | ........... | H04W 72/044 |
| | | | | | 370/311 |
| 2016/0212704 | A1* | 7/2016 | Matsunaga | ....... | H04W 72/1205 |
| 2016/0277914 | A1* | 9/2016 | Kim | .................... | H04W 56/002 |
| 2018/0152907 | A1* | 5/2018 | Zhang | ............... | H04W 56/0045 |

(Continued)

FOREIGN PATENT DOCUMENTS

| CN | 102076079 B | 7/2013 |
| CN | 103152817 B | 4/2015 |

(Continued)

OTHER PUBLICATIONS

Kaltiokallio, et al., "Enhancing the Accuracy of Radio Tomographic Imaging Using Channel Diversity", 2012 IEEE 9th International Conference on Mobile Ad-Hoc and Sensor Systems (MASS 2012), 2012, pp. 254-262.

*Primary Examiner* — Chi H Pham
*Assistant Examiner* — Vladislav Y Agureyev
(74) *Attorney, Agent, or Firm* — Holtz, Holtz & Volek PC

(57) ABSTRACT

According to one embodiment, An electronic apparatus that is capable to communicate with a wireless apparatus includes: a receiver to receive a first signal including first information in which the wireless apparatus is in a synchronous state, or a second signal including second information in which the wireless apparatus is in an asynchronous state; and a processor configured to switch the electronic apparatus from an asynchronous state to a synchronous state in response to reception of the first signal or reception of one or more of the second signals.

21 Claims, 8 Drawing Sheets

(56) References Cited

U.S. PATENT DOCUMENTS

| | | | | |
|---|---|---|---|---|
| 2019/0021063 A1* | 1/2019 | Kawasaki | ........... | H04W 56/003 |
| 2019/0110254 A1* | 4/2019 | Yerramalli | ............ | H04L 5/0078 |
| 2019/0191375 A1* | 6/2019 | Cheng | ................... | H04L 1/1607 |
| 2019/0364520 A1* | 11/2019 | Kazmi | ................. | H04W 56/00 |
| 2019/0372750 A1* | 12/2019 | Wang | ................. | H04W 56/001 |
| 2020/0037274 A1* | 1/2020 | Pan | ..................... | H04B 7/0617 |
| 2020/0059963 A1* | 2/2020 | Damnjanovic | ... | H04W 74/0808 |
| 2020/0084737 A1* | 3/2020 | Lee | ....................... | H04L 5/0048 |
| 2020/0280887 A1* | 9/2020 | Abedini | .............. | H04W 56/001 |
| 2020/0288334 A1* | 9/2020 | Takeda | ................. | H04L 5/0048 |
| 2020/0337004 A1* | 10/2020 | Li | ......................... | H04W 76/19 |
| 2020/0374702 A1* | 11/2020 | Damnjanovic | ... | H04W 72/0453 |
| 2021/0092696 A1* | 3/2021 | Ko | .................... | H04W 56/0015 |
| 2021/0274553 A1* | 9/2021 | Xue | ................. | H04W 74/0825 |
| 2022/0167444 A1* | 5/2022 | Jang | ....................... | H04L 65/40 |

FOREIGN PATENT DOCUMENTS

| | | | | |
|---|---|---|---|---|
| WO | 2009018212 A1 | 2/2009 | | |
| WO | WO-2015072796 A1 * | 5/2015 | ........ | H04W 52/0229 |
| WO | WO-2016189995 A1 * | 12/2016 | ............ | H04L 12/46 |

* cited by examiner

ELECTRONIC APPARATUS, SYSTEM, AND
METHOD

CROSS-REFERENCE TO RELATED
APPLICATIONS

This application is based upon and claims the benefit of priority from Japanese Patent Application No. 2020-155292, filed on Sep. 16, 2020; the entire contents of which are incorporated herein by reference.

FIELD

Embodiments described herein relate generally to an electronic apparatus, a system, and a method.

BACKGROUND

A wireless communication apparatus has been developed that measures propagation information between a wireless apparatus of a communication destination and the wireless communication apparatus, and transmits the propagation information to an apparatus that gathers (collects) propagation information. At this time, the wireless communication apparatus and the wireless apparatus of the communication destination are preferably in a synchronous state.

DETAILED DESCRIPTION

Figure 1:
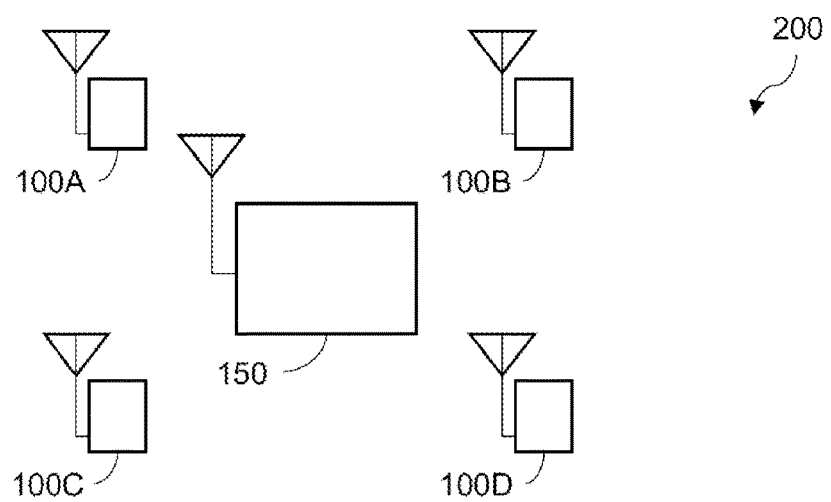
FIG. 1 is a diagram illustrating a communication system 200 according to a first embodiment.

According to an embodiment, an electronic apparatus that is capable to communicate with a wireless apparatus includes: a receiver to receive a first signal including first information in which the wireless apparatus is in a synchronous state, or a second signal including second information in which the wireless apparatus is in an asynchronous state; and a processor configured to switch the electronic apparatus from an asynchronous state to a synchronous state in response to reception of the first signal or reception of one or more of the second signals.

Hereinafter, embodiments are described in reference to the drawings. The disclosures are only examples, and the embodiments are not limited by the contents described in the following embodiments. Modifications that can be easily conceived by those skilled in the art naturally fall within the scope of the disclosure. In the drawings, the size, shape, and the like may be schematically represented to make the description more clear. In the multiple drawings, corresponding elements are denoted by the same reference numbers, and detailed descriptions may be omitted.

First Embodiment

FIG. 1 shows a communication system 200 according to the first embodiment. The communication system 200 includes a plurality of wireless communication apparatuses, for example, wireless communication apparatuses 100A, 100B, 100C, 100D, 150. The wireless communication apparatuses 100A to 100D and 150 can communicate with each other. In the present embodiment, the wireless communication apparatuses 100A to 100D and 150 perform wireless communication, but at least a part of the wireless communication apparatuses may be wired, for example, wired communication with the wireless communication apparatus 150 may be performed. The wireless communication apparatuses 100A to 100D measure information related to propagation of communication (hereinafter, also referred to as propagation information) between a wireless communication apparatus of a communication destination and the wireless communication apparatus by synchronizing with the wireless communication apparatus of the communication destination. The wireless communication apparatuses 100A to 100D transmit the measured propagation information to the wireless communication apparatus 150. The propagation information is information related to propagation of a wireless signal used for communication. The propagation information is, for example, a received signal strength indicator (RSSI), a packet error rate (PER), or the like. The propagation information includes statistics of propagation information extracted from the measured propagation information.

Wireless communication apparatuses 100A to 100D measure the propagation information between the wireless communication apparatus of the communication destination while changing a communication frequency band. Hereby, it is possible to measure propagation information between the wireless communication apparatuses 100A to 100D in a plurality of frequency bands. The wireless communication apparatus 150 gathers (collects) the propagation information between the wireless communication apparatuses 100A to 100D. The gathered (collected) propagation information is used for, for example, estimation of the distance between the wireless communication apparatuses 100A to 100D, estimation of the positions of the wireless communication apparatuses 100A to 100D, and the like.

Here, it is desirable that the wireless communication apparatuses 100A to 100D are in a synchronous state (non-synchronous state) with the wireless communication apparatus of the communication destination in a measurement of the propagation information. In a reception of the propagation information measured by the wireless communication apparatuses 100A to 100D, it is desirable that the wireless communication apparatus 150 synchronous state with the wireless communication apparatus of the communication destination.

In the present embodiment, switching of the wireless communication apparatuses 100A to 100D and 150 from the asynchronous state to the synchronous state will be described. Hereinafter, the synchronous state of the wireless communication apparatus is also referred to as a sync mode, and the asynchronous state of the wireless communication apparatus is also referred to as an async mode. The wireless communication apparatus may also be referred to as a wireless apparatus.

Figure 2:
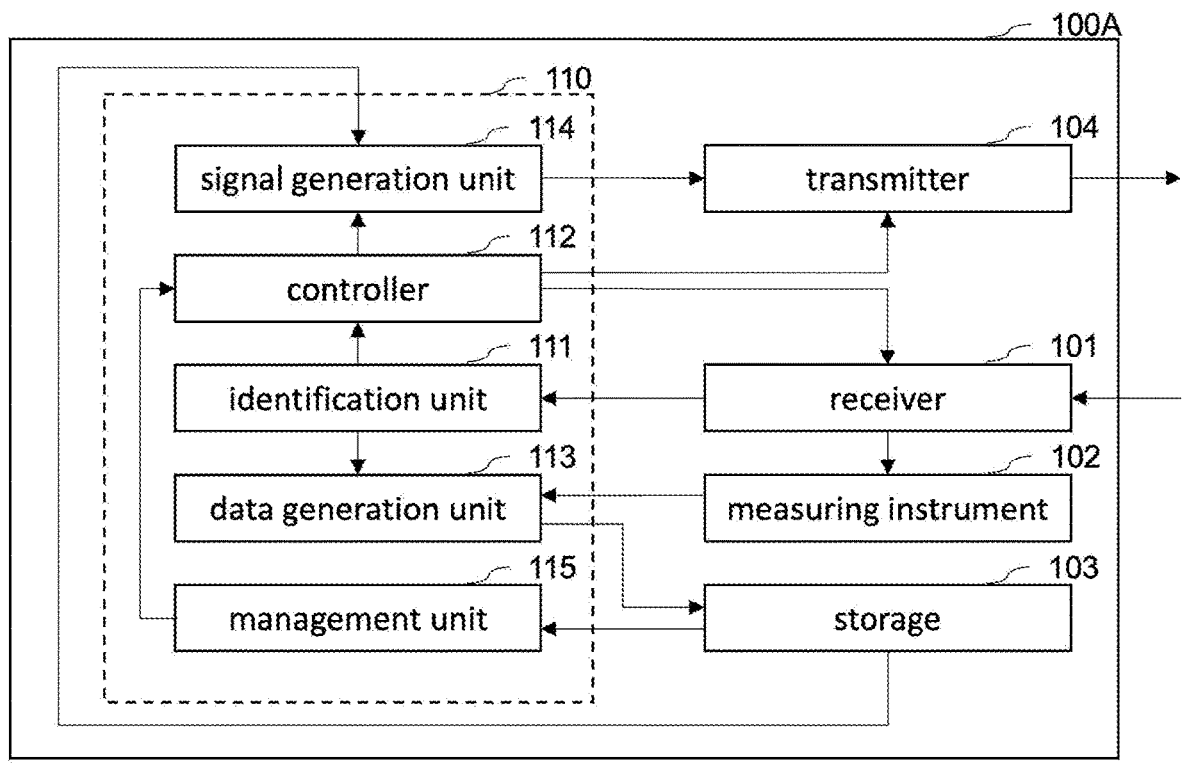
FIG. 2 is a block diagram of a wireless communication apparatus 100A.

FIG. 2 is a block diagram of the wireless communication apparatus 100A. The wireless communication apparatus 100A includes a receiver 101, a measuring instrument 102, a storage 103, a transmitter 104, and a processor 110. The processor 110 includes an identification unit 111 (identifier 111), a controller 112, a data generation unit 113 (data generator 113), a signal generation unit 114 (signal generator 114), and a management unit 115 (manager 115). The configuration diagrams of the wireless communication apparatuses 100B, 100C, and 100D are the same as that of the wireless communication apparatus 100A.

The receiver 101 includes at least one antenna and receives a wireless signal from a wireless communication apparatus of a communication destination. The wireless signal includes a signal A including information indicating that the wireless communication apparatus of the communication destination is in a synchronous state and a signal B including information indicating that the wireless communication apparatus of the communication destination is in an asynchronous state. Any of the signal A or the signal B is to be included in communication information. The communication information includes identification information of the wireless communication apparatus of a transmission source, a channel number used for communication, and the like. Hereinafter, the wireless signal related to the synchronization state may be simply referred to as a wireless signal. The identification information is information for specifying each of the wireless communication apparatuses 100A to 100D. Any information can be applied as long as each of the wireless communication apparatuses 100A to 100D can be individually specified. As the identification information, for example, device ID, MAC address, or IP address of the wireless communication apparatuses 100A to 100D. The signal A may include the propagation information measured by the wireless communication apparatus of the transmission source. The receiver 101 also sends the received wireless signal to the identification unit 111 and the measuring instrument 102.

The identification unit 111 identifies whether the wireless signal transmitted from the receiver 101 is the signal A or the signal B. The identification unit 111 sends, to the controller 112 and the data generation unit 113, information indicating whether the wireless communication apparatus of the communication destination is in the synchronous state or the asynchronous state and communication information included in the wireless signal.

The controller 112 switches the state of the wireless communication apparatus 100A from the asynchronous state to the synchronous state when the receiver 101 receives the signal A or receives a predetermined number of signals B. When the receiver 101 does not receive the signal A or does not receive a predetermined number of signals B, the controller 112 maintains the state of the wireless communication apparatus 100A in the asynchronous state.

In addition, the controller 112 causes the storage 103 to hold information indicating the state of the wireless communication information 100A. The information indicating the state of the wireless communication apparatus 100A is information indicating whether the wireless communication apparatus 100A is in the synchronous state or the asynchronous state. For example, in the initial state, the controller 112 resets the information indicating the state of the wireless communication apparatus 100A to the asynchronous state.

When the receiver 101 receives the signal A or receives a predetermined number of signals B, the controller 112 changes the information indicating the state of the wireless communication apparatus 100A to the synchronized state. When the receiver 101 does not receive the signal A or does not receive the predetermined number of signals B, the controller 112 keeps the information indicating the state of the wireless communication apparatus 100A in the asynchronous state.

When the wireless communication apparatus 100A is in the asynchronous state, the controller 112 instructs the signal generation unit 114 to generate a signal D including information indicating that the wireless communication apparatus 100A is in the asynchronous state. When the wireless communication apparatus 100A is in the synchronous state, the controller 112 instructs the signal generation unit 114 to generate a signal C including information indicating that the wireless communication apparatus 100A is in the synchronous state. In addition, the controller 112 instructs a time at which the transmitter 104 transmits the signal C or the signal D. After the wireless communication apparatus 100A enters the synchronization state, the controller 112 instructs the receiver 101 to change the frequency band of the wireless signal to be received. After the wireless communication apparatus 100A enters the synchronization state, the controller 112 instructs the transmitter 104 to change the frequency band of the wireless signal to be transmitted.

The measuring instrument 102 measures propagation information between the wireless communication apparatus of the communication destination and the wireless communication apparatus 100A based on the signal A transmitted from the receiver 101. The measured propagation information is sent to the data generation unit 113.

The data generation unit 113 converts the propagation information into data by using the propagation information transmitted from the measuring instrument 102 and the communication information transmitted from the identification unit 111. The data generation unit 113 causes the storage 103 to hold the propagation information converted into data.

The storage 103 holds the data-converted propagation information sent from the data generation unit 113. The storage 103 holds identification information of the wireless communication apparatus constituting the communication system 200, information indicating the state of the wireless communication apparatus 100A, and information necessary for synchronization. The information necessary for synchronization is, for example, information including a condition for the wireless communication apparatus 100A to enter a synchronization state, information for defining a time to transmit a signal when the wireless communication apparatus 100A enters a synchronization state, information for changing a frequency band to be transmitted and received by the wireless communication apparatus 100A, and information for defining a time to change the frequency band.

The storage 103 is a memory or the like, and is, for example, a random access memory (RAM), a programmable ROM (PROM), an erasable PROM (EPROM), an electrically EPROM (EEPROM), a flash memory, a register, or the like. The storage 103 may be provided outside the wireless communication apparatus 100A. When the storage 103 is provided outside, the storage 103 may be a cloud that holds information via the Internet.

The signal generation unit 114 generates a wireless signal. The wireless signal generated by the signal generation unit 114 is a signal C including information indicating that the wireless communication apparatus 100A is in a synchronous state and propagation information measured by the measuring instrument 102, or a signal D including information indicating that the wireless communication apparatus 100A is in an asynchronous state. When the wireless communication apparatus 100A is in a synchronous state, the signal generation unit 114 generates the signal C based on a command sent from the controller 112 and the data-converted propagation information held in the storage 103. When the wireless communication apparatus 100A is in an asynchronous state, the signal generation unit 114 generates a signal D based on a command sent from the controller 112. Both the signal C and the signal D include communication information similar to that described in the signal A and the signal B.

The transmitter 104 includes at least one antenna and transmits the signal C or the signal D transmitted from the signal generation unit 114 to the wireless communication apparatuses 100B to 100D and 150 as a wireless signal. The transmission method is arbitrary, for example, broadcast is used.

The management unit 115 reads the information necessary for synchronization from the storage 103 and sends the information to the controller 112. According to the information necessary for synchronization, the controller 112 switches the wireless communication apparatus 100A from the asynchronous state to the synchronous state and controls the signal generation unit 114, the receiver 101, and the transmitter 104 in accordance with the state of the wireless communication apparatus 100A.

The configuration of the wireless communication apparatus 100A has been described above. At least some of the components of the wireless communication apparatus 100A may be mounted on physically integrated semiconductor integrated circuits (LSIs or the like). In FIG. 2, the identification unit 111, the controller 112, the data generation unit 113, the signal generation unit 114, and the management unit 115 are included in the processor 110. The processor 110 is one or more electronic circuits including a control device and a calculation device. The electronic circuit is realized by an analog or digital circuit or the like. For example, general purpose processors, central processing units (CPUs), microprocessors, digital signal processors (DSPs), ASICs, FPGAs, and combinations thereof are possible. Alternatively, the processor 110 may be implemented by software in these electronic circuits.

Figure 3:
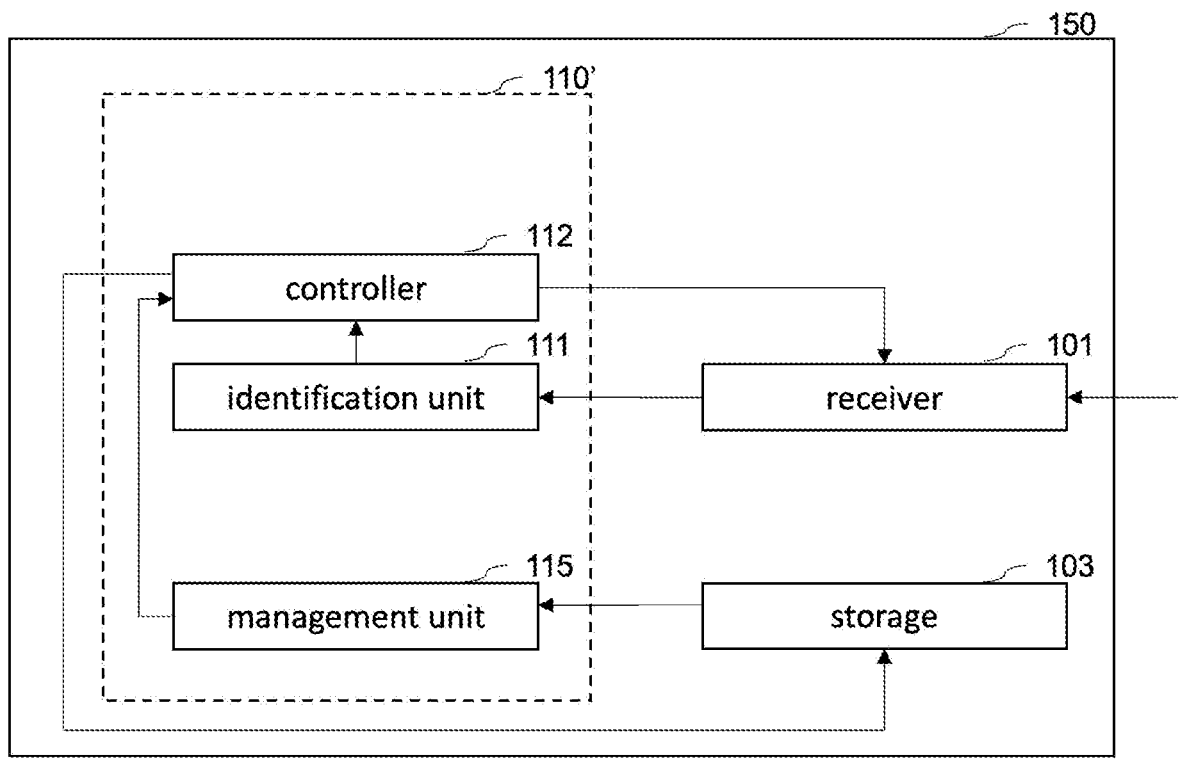
FIG. 3 is a block diagram of a wireless communication apparatus 150.

FIG. 3 is a configuration diagram of the wireless communication apparatus 150. The wireless communication apparatus 150 receives the data-converted propagation information from the wireless communication apparatuses 100A to 100D. The wireless communication apparatus 150 includes a receiver 101, a storage 103, and a processor 110'. The processor 110' includes an identification unit 111, a controller 112, and a management unit 115. The receiver 101, the storage 103, the identification unit 111, the controller 112, and the management unit 115 are the same as those described in the configuration of the wireless communication apparatus 100A, and description thereof will be omitted. The wireless communication apparatus 150 does not transmit a wireless signal. The wireless communication apparatus 150 may not include items related to transmission of a wireless signal in the receiver 101, the storage 103, the identification unit 111, the controller 112, and the management unit 115. At least a part of the components of the wireless communication apparatus 150 may be mounted on a physically integrated semiconductor integrated circuit (LSI or the like). The processor 110' may be implemented similarly to the description of the processor 110.

The wireless communication apparatus 150 receives the data-converted propagation information and causes the storage 103 of the wireless communication apparatus 150 to hold the data-converted propagation information The propagation information is used, for example, for estimation of the distance between the wireless communication apparatuses 100A to 100D, estimation of the position of the wireless communication apparatuses 100A to 100D, and the like. These estimations may be performed by the wireless communication apparatus 150 or by an estimation apparatus connected to the wireless communication apparatus 150.

Figure 4:
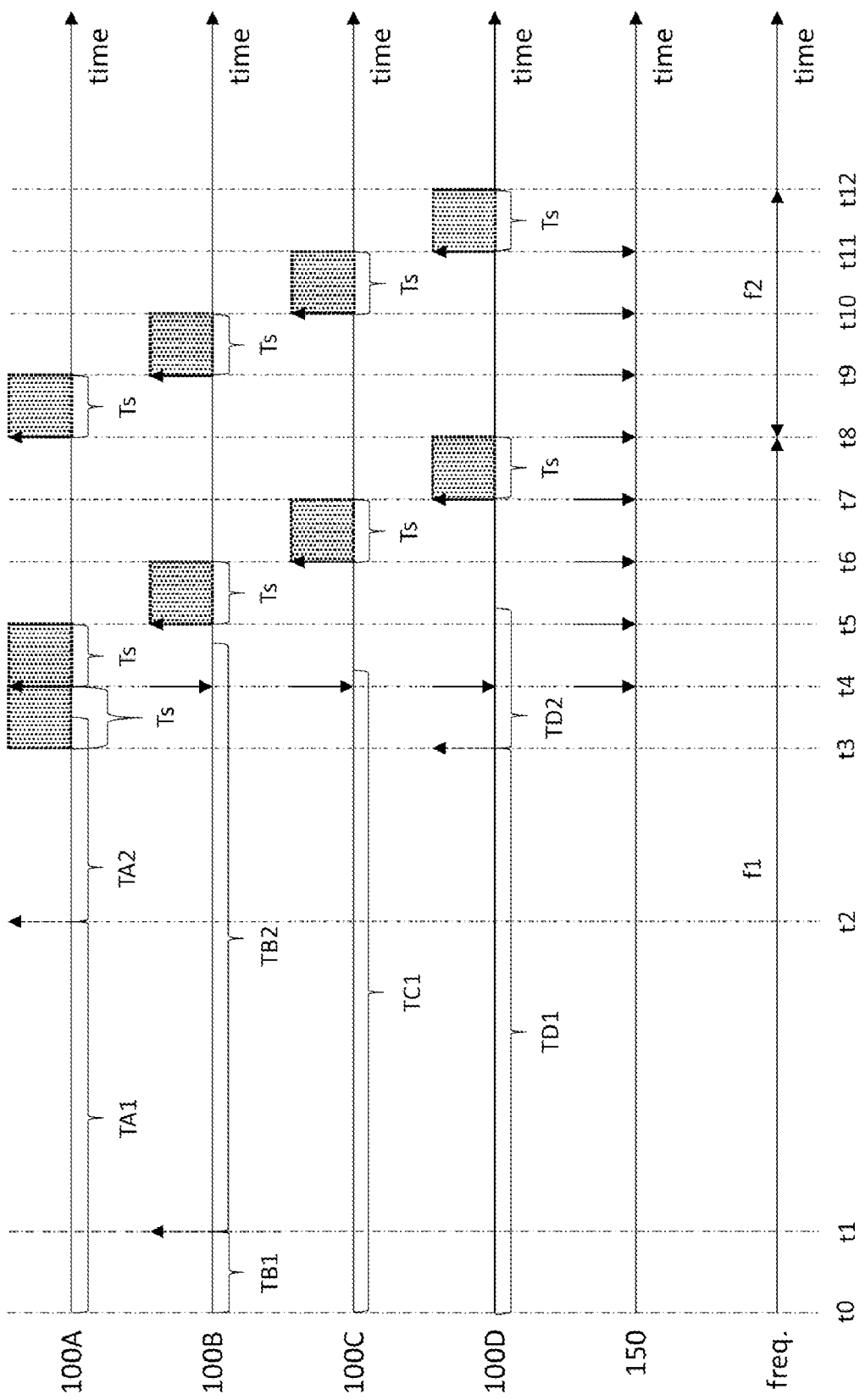
FIG. 4 is a sequence diagram of the operation of the communication system 200 in the first embodiment.

The configurations of the wireless communication apparatuses 100A to 100D and 150 of the present embodiment have been described above. Hereinafter, an operation example of the communication system 200 will be described. FIG. 4 is a sequence diagram of the operation of the communication system 200. FIG. 4 illustrates, as an example, a sequence diagram in a case where the wireless communication apparatuses 100A to 100D and 150 switch from the asynchronous state to the synchronous state, and the wireless communication apparatuses 100A to 100D measure and transmit propagation information between the wireless communication apparatuses 100A to 100D. In the present embodiment, as an example, the signals A to D are assumed to be beacon signals, and RSSI is assumed to be propagation information.

Hereinafter, the wireless communication apparatus 100A is used as a reference. Among wireless signals received by the wireless communication apparatus 100A, that is, wireless signals transmitted by the wireless communication apparatuses 100B to 100D, a signal including information indicating that the wireless communication apparatus of the transmission source is in a synchronous state is represented as a signal A, and a signal including information indicating that the wireless communication apparatus of the transmission source is in an asynchronous state is represented as a signal B. Among wireless signals transmitted by the wireless communication apparatus 100A, that is, wireless signals received by the wireless communication apparatuses 100B to 100D and 150, a signal including information indicating that the wireless communication apparatus 100A is in a synchronous state is represented as a signal C, and a signal including information indicating that the wireless communication apparatus 100A is in an asynchronous state is represented as a signal D. That is, the signal A corresponds to the signal C, the signal B corresponds to the signal D.

Times t0 to t3 in FIG. 4 represent an operation of the communication system 200 until the wireless communication apparatus 100A switches from the asynchronous state to the synchronous state. Each of the wireless communication apparatuses 100A to 100D transmits a wireless signal including information indicating that the wireless communication apparatus of the transmission source is in an asynchronous state at a random time. The transmission method of this signal is arbitrary, and for example, broadcast is used. Wireless communication apparatuses 100A to 100D attempt to receive the signal A (signal C) including information indicating that the wireless communication apparatus of the communication destination is in a synchronous state, and the signal B (signal D) including information indicating that the wireless communication apparatus of the communication destination is in an asynchronous state. When the wireless communication apparatuses 100A to 100D receive the signal A (signal C) or receive a predetermined number (one or more) of the signals B (signals D), the wireless communication apparatuses 100A to 100D switch their own states from the asynchronous state to the synchronous state.

Here, in the communication system 200, when all the wireless communication apparatuses 100A to 100D are in the synchronous state, the signal A or the signal C is transmitted in the order of the wireless communication apparatuses, 100B, 100C, and 100D. After the wireless communication apparatus 100D transmits the signal A, the wireless communication apparatus 100A transmits the signal C. In this case, it is desirable to switch from the asynchronous state to the synchronous state in the order of the wireless communication apparatuses 100A, 100B, 100C, and 100D. In the present embodiment, as a condition for the wireless communication apparatuses 100A to 100D to switch from the asynchronous state to the synchronous state, a wireless signal (signal A or signal C) is received from the wireless communication apparatus in the synchronous state, or a predetermined number of wireless signals (signal B or signal D) are received from the wireless communication apparatus in the asynchronous state. Here, the predetermined numbers of the signal B and the signal D are increased in the order of the wireless communication apparatuses 100A, 100B, 100C, and 100D so that the wireless communication apparatuses 100A, 100B, 100C, and 100D are easily switched from the asynchronous state to the synchronous state. The predetermined number of the signal B and the signal D are defined in relation to synchronization with the wireless communication apparatuses 100A to 100D. The predetermined number of the signals B and the signals D set in each of the wireless communication apparatuses 100A to 100D are included in the condition for entering the synchronous state. For example, the wireless communication apparatus 100A receives two signals B, the wireless communication apparatus 100B receives three signals B and D, the wireless communication apparatus 100C receives four signals B and D, and the wireless communication apparatus 100D receives five signals B and D, thereby switching from the asynchronous state to the synchronous state.

Hereinafter, the operation of the communication system 200 at times t0 to t3 will be described with reference to FIG. 4. At time t0, the wireless communication apparatus 100A performs initialization. As initialization, for example, the wireless communication apparatus 100A sets its own state to the asynchronous state. The wireless communication apparatus 100A resets the number of signals B received so far. A frequency band transmitted or received by the wireless communication apparatus 100A (hereinafter, also referred to as a frequency band used for communication) is denoted by f1. Each of the wireless communication apparatuses 100B to 100D and 150 performs initialization similarly to the wireless communication apparatus 100A. The wireless communication apparatuses 100B to 100D reset the number of signals B and signals D received so far. At time t0, the wireless communication apparatuses 100A to 100D and 150 are in the asynchronous state.

The wireless communication apparatus 100A determines a waiting time for waiting to transmit a signal (signal D) including information indicating that the wireless communication apparatus A100 is in the asynchronous state. The waiting time is, for example, a random time interval. The wireless communication apparatus 100A determines a waiting time TA1, and determines to transmit the signal D at time t2 after the waiting time TA1 has elapsed from the time t0. Similarly, each of the wireless communication apparatuses 100B to 100D determines the waiting time. The wireless communication apparatus 100B determines to transmit a signal (signal B) including information indicating that the wireless communication apparatus 100B is in the asynchronous state at time t1 after the waiting time TB1 has elapsed from time t0. The wireless communication apparatus 100C determines to transmit the signal B after the waiting time TC1 has elapsed from the time t0. The wireless communication apparatus 100D determines to transmit the signal B after the waiting time TD1 has elapsed from the time t0. Thereafter, the wireless communication apparatuses 100A to 100D and 150 attempt to receive wireless signals. Hereinafter, since a time from a transmission of a signal by a wireless communication apparatus of a transmission source to a reception of the signal by a wireless communication apparatus of a wireless destination is short, it is expressed that the transmission and the reception are performed at a same time. The transmission and the reception are not limited actually at the same time.

At time t1, wireless communication apparatus 100B transmits the signal B. Wireless communication apparatus 100A, 100C, 100D, 150 receives the signal B from wireless communication apparatus 100B. Based on the communication information of the signal B, the wireless communication apparatuses 100A, 100C, 100D, and 150 recognize that the transmission source of the signal B is the wireless communication apparatus 100B. Since the wireless communication apparatuses 100A, 100C, 100D, 150 have not yet received the predetermined number of signals B, they continue to receive wireless signals. Since the wireless communication apparatus 100B is in the asynchronous state, the wireless communication apparatus 100B determines a waiting time for transmitting the signal B again. The wireless communication apparatus 100B determines to transmit the signal B after the waiting time TB2 has elapsed from the time t1.

At time t2, wireless communication apparatus 100A transmits the signal D. The wireless communication apparatuses 100B to 100D and 150 receive the signal D from the wireless communication apparatus 100A. The signal D includes information indicating that the wireless communication apparatus of the transmission source is in the asynchronous state like the signal B. Since the wireless communication apparatuses 100B to 100D and 150 have not yet received the predetermined number of signals B and D, they continue to receive the wireless signals. Since the wireless communication apparatus 100A is in the asynchronous state, the wireless communication apparatus 100A determines a waiting time for transmitting the signal D again. The wireless communication apparatus 100A determines to transmit the signal D after the waiting time TA2 has elapsed from the time t2.

At time t3, wireless communication apparatus 100D transmits the signal B. The wireless communication apparatuses 100A to 100C and 150 receive the signal B from the wireless communication apparatus 100D. Since the wireless communication apparatus 100B, 100C, 150 has not yet received the predetermined number of signals B and D, they continue to receive the wireless signals. Since the wireless communication apparatus 100D is in the asynchronous state, the wireless communication apparatus 100D determines a waiting time for transmitting the signal B again. The wireless communication apparatus 100D determines to transmit the signal B after the waiting time TD2 has elapsed from the time t3.

Here, the wireless communication apparatus 100A receives 2 signals B. Since the wireless communication apparatus 100A has received the predetermined number of signals B, the wireless communication apparatus 100A switches own state from the asynchronous state to the synchronous state. Based on from the communication information of the signal B transmitted by the wireless communication apparatus 100D, the wireless communication apparatus 100A recognizes that the transmission source is the wireless communication apparatus 100D, and that the transmission time of the signal B is the time t3. The wireless communication apparatus 100A cancels the schedule of transmitting the signal D by switching to the synchronous state, and determines a time of transmitting the signal C including the information indicating that the wireless communication apparatus 100A is in the synchronous state.

The wireless communication apparatus 100A considers a case where the wireless communication apparatuses 100B to 100D are in a synchronization state in determining the time for transmitting the signal C. That is, the wireless communication apparatus 100A determines the time to transmit the signal C so as not to conflict with the time to transmit the signal A when the wireless communication apparatuses 100B to 100D are in the synchronous state. In FIG. 4, the wireless communication apparatus 100A considers that the wireless communication apparatus 100D transmits the signal at a time t3, and determines to transmit the signal C at a time t4 after a time Ts from the time t3.

The time Ts will be described. When each of the wireless communication apparatuses 100A to 100D is in the synchronous state, it is determined that the wireless communication apparatuses 100A to 100D do not transmit a signal for a predetermined time (Ts) after the signal A or the signal C is transmitted. The predetermined time (Ts) is a time defined in relation to synchronization of the wireless communication apparatuses 100A to 100D, and is also referred to as a time slot. The time length of the time slot is denoted by Ts in FIG. 4. The information of the time length of the time slot is held in the storage 103 as information for defining the time at which the signal C is transmitted when the wireless communication apparatus 100A enters the synchronized state. In the present embodiment, when all the wireless communication apparatuses 100A to 100D enter the synchronous state, the wireless communication apparatuses 100A to 100D can transmit the signal A or the signal C at each time Ts in the order of the wireless communication apparatuses 100A, 1008, 100C, 100D according to the identification information of each wireless communication apparatus 100A to 100D and the information of the time length of the time slot. That is, the waiting time for the wireless communication apparatuses 100A to 100D to transmit the signal A or the signal C is an integer multiple of the time Ts from a previous transmission of the signal A or the signal C.

From the above, the wireless communication apparatus 100A enters the synchronous state. An operation of the communication system 200 after time t4 will be described. The wireless communication apparatus 100A transmits a signal C including information indicating that the wireless communication apparatus 100A is in the synchronous state. The wireless communication apparatuses 100B to 100D and 150 are switched from the asynchronous state to the synchronous state by receiving the signal C. The wireless communication apparatuses 100A to 100D transmit the signal A or the signal C including information indicating that each of the wireless communication apparatuses 100A to 100D is in the synchronous state in the order of the wireless communication apparatuses 100A, 100B, 100C, 100D. Each of the wireless communication apparatuses 100A to 100D measure the propagation information with the wireless communication apparatus of the transmission source and in accordance with a reception of the signal A or the signal C. Each of the wireless communication apparatuses 100A to 100D transmits the signal A or the signal C one times, and then measures propagation information and transmits the signal A or the signal C while changing a frequency band used for communication.

At time t4, wireless communication apparatus 100A transmits the signal C. The wireless communication apparatuses 100B to 100D and 150 receive the signal C from the wireless communication apparatus 100A. Since the signal C includes information indicating that the wireless communication apparatus 100A is in the synchronous state, the wireless communication apparatuses 100B to 100D and 150 switch their states from the asynchronous state to the synchronous state. The wireless communication apparatus 100A determines to transmit the signal C at time t8 in consideration of the time slot accompanying the transmission of the signal C and the time slots accompanying the transmission of the signals A of the wireless communication apparatuses 100B to 100D. The time t8 is after the time 4 Ts from the time t4.

The wireless communication apparatuses 100B to 100D and 150 recognize that the wireless communication apparatus 100A has transmitted at the time t4 by the signal C. The wireless communication apparatuses 100B to 100D cancel the schedule of transmitting the signal B and determine a time of transmitting the signal A including the information indicating that each of the wireless communication apparatuses 100B to 100D is in the synchronous state. In order to transmit the signal A next to the wireless communication apparatus 100A, the wireless communication apparatus 100B determines to transmit the signal A at a time t5. The time t5 is after the time Ts from the time t4. In order to transmit the signal A next to the wireless communication apparatus 100B, the wireless communication apparatus 100C determines to transmit the signal A at a time t6. The time t6 is after the time Ts from the time t5. In order to transmit the signal A next to the wireless communication apparatus 100C, the wireless communication apparatus 100D determines to transmit the signal A at a time t7. The time t7 is after the time Ts from the time t6.

In addition, each of the wireless communication apparatuses 100B to 100D measure the propagation information with the wireless communication apparatus 100A in the frequency band f1 in accordance with reception of the signal C from the wireless communication apparatus 100A. The propagation information is converted into data, which is included in the signal A and transmitted.

In addition, the wireless communication apparatuses 100A to 100D and 150 determine the time at which the frequency band used for communication is changed based on the information indicating the transmission time (time t4) included in the signal C and the identification information of the wireless communication apparatus 100A of the transmission source.

When the wireless communication apparatuses 100A to 100D enter the synchronous state and transmit the signal A or the signal C 1 times each, all pieces of propagation information between the wireless communication apparatuses 100A to 100D in the frequency band f1 can be measured. The wireless communication apparatuses 100A to 100D change the frequency band used for communication in order to measure the propagation information between the wireless communication apparatuses 100A to 100D in a frequency band different from the frequency band f1. For example, the wireless communication apparatuses 100A to 100D and 150 determine the time at which the frequency band used for communication is changed from f1 to f2. The change destination of the frequency band is included in the information for changing the frequency band received by the wireless communication apparatus 100A (to 100D and 150).

In addition, when the wireless communication apparatuses 100A to 100D and 150 are in synchronous state, the wireless communication apparatuses 100A to 100D and 150 are in synchronous state even when the frequency band used for communication is changed.

Since the wireless communication apparatuses 100A to 100D and 150 recognize that the transmission time of the signal C of the wireless communication apparatus 100A is t4 and the time length of the time slot is Ts, the wireless communication apparatuses 100B to 100D recognize that the signal A is transmitted one times for each time Ts from the time t5 to the time t7. Therefore, the wireless communication apparatuses 100B to 100D and 150 determine the time at which the frequency band used for communication is changed from f1 to f2 between the times t7 to t8. Note that information of the time length Ts of the time slot is held in the storage 103 as information for defining the time at which the frequency band is changed.

At time t5, wireless communication apparatus 100B transmits the signal A. Wireless communication apparatus 100A, 100C, 100D, 150 receives the signal A from wireless communication apparatus 100B. The signal A includes information indicating that the wireless communication apparatus 100B is in the synchronous state, and data-converted propagation information between the wireless communication apparatuses 100A and 100B in the frequency band f1. The wireless communication apparatus 100B determines to transmit the signal A at time t9 in consideration of the time slot associated with the transmission of its own signal A and the time slots associated with the transmission of the signal A and the signal C of the wireless communication apparatuses 100A, 100C, and 100D. The time t9 is after the time 4 Ts from the time t5.

In addition, each of the wireless communication apparatuses 100A, 100C, and 100D measures propagation information with the wireless communication apparatus 100B in the frequency band f1 in accordance with the reception of the signal A from the wireless communication apparatus 100B. The propagation information is converted into data and transmitted by the signal A or the signal C of the wireless communication apparatuses 100A, 100C and 100D.

At time t6, wireless communication apparatus 100C transmits the signal A. Wireless communication apparatus 100A, 100B, 100D, 150 receives the signal A from wireless communication apparatus 100C. The signal A includes information indicating that the wireless communication apparatus 100C is in the synchronized state, and information on data-converted propagation in the frequency band f1 between the wireless communication apparatuses 100A and 100C and between the wireless communication apparatuses 100B and 100C. The wireless communication apparatus 100C determines to transmit the signal A at time t10 in consideration of the time slot associated with the transmission of its own signal A and the time slots associated with the transmission of the signal A and the signal C of the wireless communication apparatuses 100A, 100B, and 100D. The time t10 is after the time 4 Ts from the time t6.

In addition, each of the wireless communication apparatuses 100A, 100B, and 100D measures propagation information with the wireless communication apparatus 100C in the frequency band f1 in accordance with the reception of the signal A from the wireless communication apparatus 100C. The propagation information is converted into data and transmitted by the signal A or the signal C of the wireless communication apparatuses 100A, 100B and 100D.

At time t7, wireless communication apparatus 100D transmits the signal A. The wireless communication apparatuses 100A to 100C and 150 receive the signal A from the wireless communication apparatus 100D. The signal A includes information indicating that the wireless communication apparatus 100D is in the synchronized state, and propagation information in the frequency band f1 between the wireless communication apparatuses 100A and 100D, between the wireless communication apparatuses 100B and 100D, and between the wireless communication apparatuses 100C and 100D. The wireless communication apparatus 100D determines to transmit the signal A at time t11 in consideration of the time slot accompanying the transmission of the signal A of the wireless communication apparatus A1 and the time slot accompanying the transmission of the signal A and the signal C of the wireless communication apparatuses 100A to 100C. The time t11 is after the time 4 Ts from the time t7.

In addition, each of the wireless communication apparatuses 100A, 100B, and 100C measures propagation information with the wireless communication apparatus 100D in the frequency band f1 in accordance with the reception of the signal A from the wireless communication apparatus 100D. The propagation information is converted into data and transmitted by the signal A or the signal C of the wireless communication apparatuses 100A, 100B and 100C.

The wireless communication apparatuses 100A to 100D change the frequency band used for communication from f1 to f2 at the time determined between the times t7 to t8.

At time t8, wireless communication apparatus 100A transmits the signal C. The wireless communication apparatuses 100B to 100D and 150 receive the signal C from the wireless communication apparatus 100A. The data-converted propagation information included in the signal C is propagation information between the wireless communication apparatuses 100A and 100B, between the wireless communication apparatuses 100A and 100C, and between the wireless communication apparatuses 100A and 100D in the frequency band f1. The wireless communication apparatus 100A determines to transmit the signal A after the time 4 Ts from the time t8.

In addition, each of the wireless communication apparatuses 100B to 100D measures propagation information with the wireless communication apparatus 100A in the frequency band f2 in accordance with the reception of the signal C from the wireless communication apparatus 100A. The propagation information is converted into data, which is included in the signal A and transmitted.

At time t9, wireless communication apparatus 100B transmits the signal A. Wireless communication apparatus 100A, 100C, 100D, 150 receives the signal A from wireless communication apparatus 100B. The data-converted propagation information included in the signal A is propagation information in the frequency band f1 between the wireless communication apparatuses 100B and 100C and between the wireless communication apparatuses 100B and 100D, and propagation information between the wireless communication apparatuses 100A and 100B in the frequency band f2. The wireless communication apparatus 100B determines to transmit the signal A after the time 4 Ts from the time t9.

In addition, each of the wireless communication apparatuses 100A, 100C, and 100D measure propagation information with the wireless communication apparatus 100B in the frequency band f2 in accordance with the reception of the signal A from the wireless communication apparatus 100B. The propagation information is converted into data, and transmitted by the signal A or the signal C.

At time t10, wireless communication apparatus 100C transmits the signal A. Wireless communication apparatus 100A, 100B, 100D, 150 receives the signal A from wireless communication apparatus 100C. The data-converted propagation information included in the signal A is propagation information between the wireless communication apparatuses 100C and 100D in the frequency band f1, and propagation information in the frequency band f2 between the wireless communication apparatuses 100A and 100C and between the wireless communication apparatuses 100B and 100C. The wireless communication apparatus 100C determines to transmit the signal A after the time 4 Ts from the time t10.

In addition, each of the wireless communication apparatuses 100A, 1008, and 100D measures propagation information with the wireless communication apparatus 100C in the frequency band f2 in accordance with the reception of the signal A from the wireless communication apparatus 100C. The propagation information is converted into data, and transmitted by the signal A or the signal C.

At time t11, wireless communication apparatus 100D transmits signal A. The wireless communication apparatuses 100A to 100C and 150 receive the signal A from the wireless communication apparatus 100D. The data-converted propagation information included in the signal A is propagation information between the wireless communication apparatuses 100A and 100D, between the wireless communication apparatuses 100B and 100D, and between the wireless communication apparatuses 100C and 100D. The wireless communication apparatus 100D determines to transmit the signal A after the time 4 Ts from the time t11.

In addition, each of the wireless communication apparatuses 100A, 1008, and 100C measures propagation information with the wireless communication apparatus 100D in the frequency band f2 in accordance with the reception of the signal A from the wireless communication apparatus 100D. The propagation information is converted into data, and transmitted by the signal A or the signal C.

Figure 5:
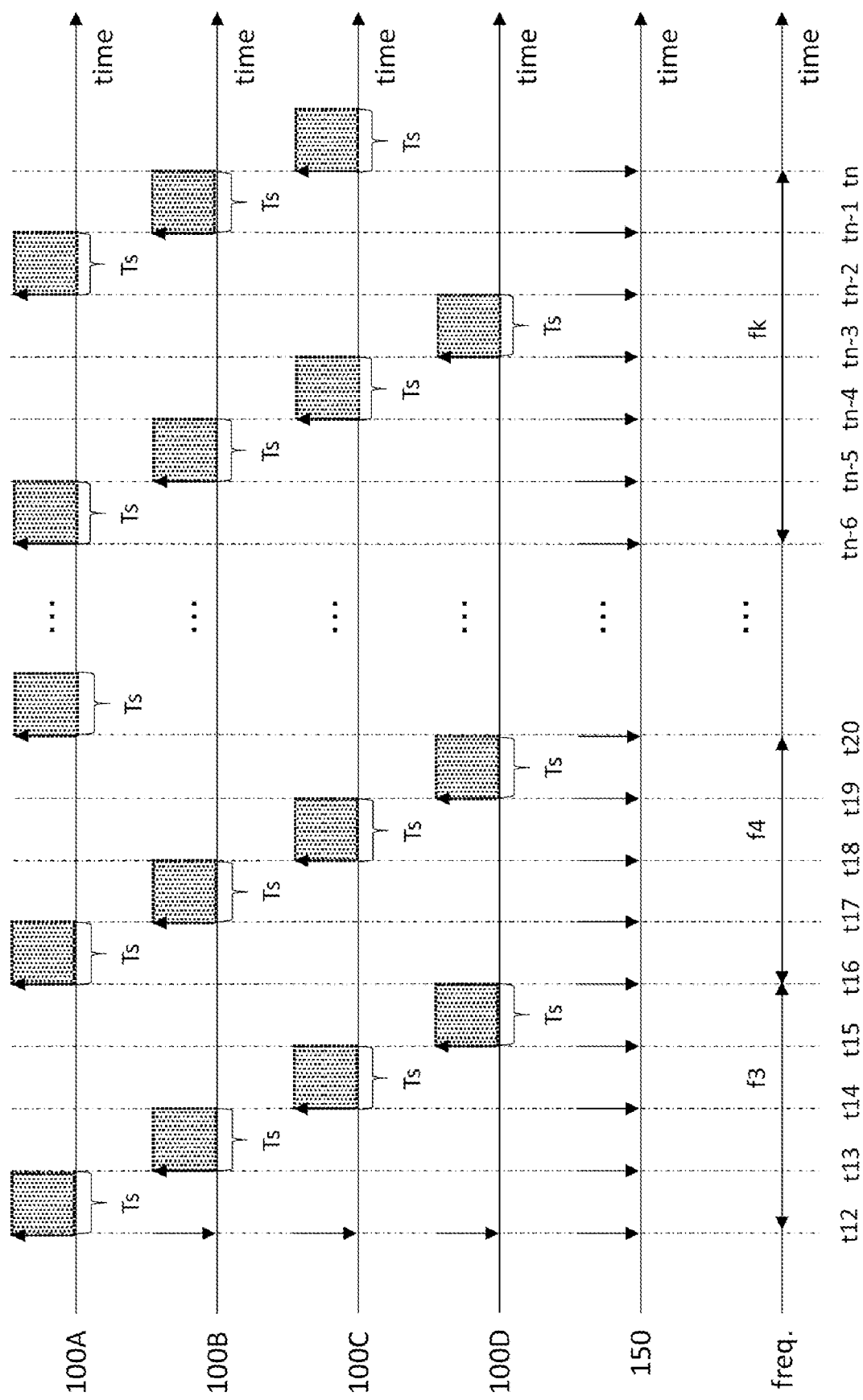
FIG. 5 is a sequence diagram of the operation of the communication system 200 after time t12 in FIG. 4.

Thereafter, the wireless communication apparatuses 100A to 100D measure the propagation information with the wireless communication apparatus of the transmission source of the wireless signal while changing the frequency band used for communication. The wireless communication apparatuses 100A to 100D transmit the signal A or the signal C including the data-converted propagation information. The propagation information converted into data is also received by the wireless communication apparatus 150. The propagation information converted into data is held in the storage 103 of the wireless communication apparatus 150. For example, FIG. 5 is a sequence diagram illustrating an operation of the wireless system 200 after time t12 in FIG. 4.

The wireless communication apparatuses 100A to 100D measure the propagation information with the wireless communication apparatus of the communication destination in the same manner as the times t4 to t8 and the times t8 to t12 in FIG. 4. The wireless communication apparatuses 100A to 100D use the frequency band f3 at times t12 to t16 and use the frequency band f4 at times t16 to t20. Here, it is assumed that the wireless communication apparatuses 100A to 100D measure propagation information in the frequency band f1 to fk. After time tn-6, the wireless communication apparatuses 100A to 100D use the frequency band fk for communication.

At time tn-3, wireless communication apparatus 100D transmits the signal A. The wireless communication apparatuses 100A to 100C receive the signal A and measure propagation information with the wireless communication apparatus 100D. Thus, the measurement of the propagation information between the wireless communication apparatus of the communication destination and the wireless communication apparatus 100D in the frequency band fk is completed.

At time tn-2, wireless communication apparatus 100A transmits the signal C. The data-converted propagation information included in the signal C is propagation information in the frequency band fk between the wireless communication apparatuses 100A and 100B, between the wireless communication apparatuses 100A and 100C, and between the wireless communication apparatuses 100A and 100D. The wireless communication apparatus 150 receives the signal C and receives the propagation information converted into data.

At time tn-1, wireless communication apparatus 1006 transmits the signal A. The data-converted propagation information included in the signal A is propagation information in the frequency band fk between the wireless communication apparatuses 100B and 100C and between the wireless communication apparatuses 100B and 100D. The wireless communication apparatus 150 receives the signal C and receives the propagation information converted into data.

At time tn, wireless communication apparatus 100C transmits the signal A. The data-converted propagation information included in the signal A is propagation information between the wireless communication apparatuses 100C and 100D in the frequency band fk. The wireless communication apparatus 150 receives the signal C and receives the propagation information converted into data. As described above, at the time tn, the measurement of the propagation information between the wireless communication apparatuses 100A to 100D and the transmission the propagation information to the wireless communication apparatus 150 in the frequency bands f1 to fk are completed. The wireless communication apparatuses 100A to 100D may measure the propagation information between the wireless communication apparatuses 100A to 100D from the frequency band f1 again.

Figure 6:
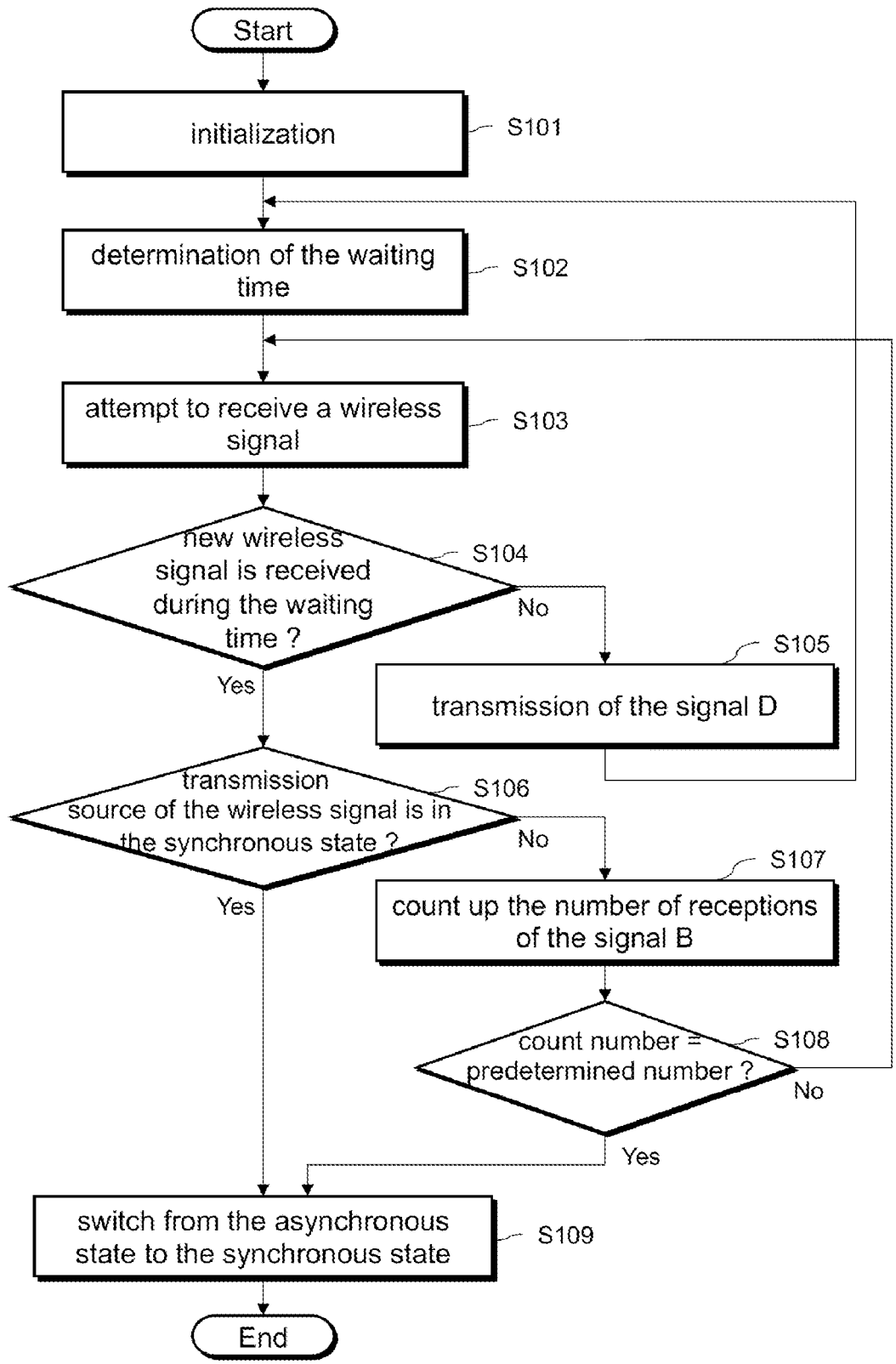
FIG. 6 is a flow chart of the operation of the wireless communication apparatus 100A in switching from asynchronous state to the synchronous state.

FIG. 6 is a flowchart for explaining an operation of the wireless communication apparatus 100A in switching from the asynchronous state to the synchronous state. This flowchart corresponds to times t0 to t3 in FIG. 4. The operation of the wireless communication apparatus 100A will be described with reference to FIGS. 4 and 6. The wireless communication apparatuses 100B to 100D operate in the same manner as the wireless communication apparatus 100A.

The controller 112 performs initialization (step S101). The controller 112 switches the wireless communication apparatus 100A to the asynchronous state and resets a number of signals B received so far. The controller 112 switches the frequency band used for communication by the receiver 101 and the transmitter 104 to f1.

The controller 112 determines the waiting time (TA1) for transmitting the signal D including information indicating that the wireless communication apparatus 100A is in the asynchronous state (step S102). The above steps S101 and S102 are performed by time t0. The controller 112 causes the receiver 101 to attempt to receive a wireless signal (step S103). While the waiting time TA1, the controller 112 waits to receive wireless signals from the wireless communication apparatuses 100B to 100D of the wireless system 200.

The controller 112 checks whether a new wireless signal is received during the waiting time TA1 (step S104). When the receiver 101 newly receives a wireless signal (step S104: Yes), the identification unit 111 recognizes whether the wireless communication apparatus of the transmission source is in the synchronous state or the asynchronous state based on the received wireless signal (step S106). For example, in FIG. 4, receiver 101 receives the signal B from wireless communication apparatus 100B at the time t1.

On the other hand, when the receiver 101 does not receive a new wireless signal (step S104: No), the controller 112 instructs the signal generation unit 114 to generate the signal D including information indicating that the wireless communication apparatus 100A is in the asynchronous state, and instructs the transmitter 104 to transmit the signal D (step S105). For example, in FIG. 4, the receiver 101 does not newly receive a wireless signal between the time t1 and the time t2, and the transmitter 104 transmits a signal D at the time t2. After step S105, the process returns to step S102, and the controller 112 determines the waiting time (TA2) for transmitting the signal D.

In step S106, the identification unit 111 identifies based on the wireless signal transmitted from the receiver 101 whether the wireless communication apparatus that is the transmission source of the wireless signal is in the synchronous state or the asynchronous state. The information identified by the identification unit 111 is sent to the controller 112.

When the wireless communication apparatus that is the transmission source of the received wireless signal is in the synchronous state (step S106: Yes), the controller 112 switches the state of the wireless communication apparatus 100A from the asynchronous state to the synchronous state (step S109). The controller 112 instructs the signal generation unit 114 to generate the signal C. The controller 112 determines a time at which the signal C is transmitted and a time at which the frequency band used for communication is changed by using the identification information of the wireless communication apparatus of the transmission source and the information indicating the transmission time of the wireless signal included in the received wireless signal. For example, in FIG. 4, the wireless communication apparatuses 100B to 100D and 150 that have received the signal C from the wireless communication apparatus 100A in the synchronous state switch from the asynchronous state to the synchronous state at time t4.

On the other hand, when the wireless communication apparatus that is the transmission source of the received wireless signal is in the asynchronous state (step S106: No), the controller 112 counts up the number of receptions of the signal B (step S107). For example, in FIG. 4, the receiver 101 receives the signal B from the wireless communication apparatus 100B at the time t1, and the identification unit 111 identifies that the wireless communication apparatus 100B of the transmission source is in the asynchronous state. The controller 112 sets the number of times of reception of the signal B to one from the result of identification by the identification unit 111.

The controller 112 checks whether the number of receptions of the signal B is a predetermined number (step S108). The predetermined number is a number defined in relation to synchronization of the wireless communication apparatuses 100A to 100D. In the present embodiment, as an example, two is the predetermined number in the wireless communication apparatus 100A. When the number of receptions of the signal B reaches the predetermined number (step S108: Yes), the controller 112 switches the state of the wireless communication apparatus 100A from the asynchronous state to the synchronous state (step S109). For example, in FIG. 4, the receiver 101 receives the signal B from the wireless communication apparatus 100D at time t3, and the identification unit 111 identifies that the wireless communication apparatus 100D of the transmission source is in the asynchronous state. The controller 112 recognizes that the signal B has been received two times from the result of identification by the identification unit 111. Since the number of receptions of the signal B is the predetermined number, the controller 112 switches the state of the wireless communication apparatus 100A from the asynchronous state to the synchronous state.

On the other hand, when the number of times of reception of the signal B does not reach the predetermined number (step S108: No), the process returns to step S103, and the controller 112 causes the receiver 101 to continue to receive the wireless signal. For example, in FIG. 4, the receiver 101 receives the signal B from the wireless communication apparatus 100B at time t1, but since the number of times of receiving the signal B is 1, the receiver 101 continues to attempt to receive the wireless signal even after time t1.

As described above, the controller 112 ends the switching from the asynchronous state to the synchronous state through step S109.

The wireless communication apparatus 100A of the present embodiment has been described above. The wireless communication apparatus 100A and the communication system 200 described in the present embodiment are examples, and various modifications can be implemented and executed. Modifications of the present embodiment will be described below.

(Modification 1)

In the present embodiment, the wireless communication apparatus 150 gathers (collects) the data-converted propagation information between the wireless communication apparatuses 100A to 100D. The data-converted propagation information may be gathered (collected) by at least one of the wireless communication apparatuses 100A to 100D other than the wireless communication apparatus 150.

(Modification 2)

In the present embodiment, the wireless communication apparatuses 100A to 100D measure the propagation information with the wireless communication apparatus of the transmission source in accordance with the reception of the signal A or the signal C. The wireless communication apparatuses 100A to 100D may measure propagation information with the wireless communication apparatus of the transmission source in accordance with the reception of the signal B or the signal D. The propagation information measured by the signal B and the signal D are converted into data in the same manner as in the present embodiment, and the data-converted propagation information are gathered (collected) by the wireless communication apparatus 150.

(Modification 3)

In the present embodiment, the time length of the time slot is Ts, and the time length is common to the wireless communication apparatuses 100A to 100D. The time length of the time slot may be different (or at least partially different) for each of the wireless communication apparatuses 100A to 100D. For example, the time length of the time slot when the wireless communication apparatus 100A transmits the signal C may be TsA, and the time lengths of the time slots when the wireless communication apparatuses 100B to 100D transmit the signals A may be TsB, TsC, and TsD, respectively. Note that the time length of the time slot is held by each of the wireless communication apparatuses 100A to 100D as information for defining at which a signal is transmitted when the wireless communication apparatus 100A (to 100D) enters the synchronous state.

(Modification 4)

In the present embodiment, the wireless communication apparatuses 100A to 100D measure propagation information between communication destinations in the synchronous state, but may measure and transmit propagation information between communication destinations in an asynchronous state. In this case, in the example of FIG. 4, the signal C transmitted by the wireless communication apparatus 100A includes the data-converted propagation information between the wireless communication apparatus 100A and the wireless communication apparatus 100B in the asynchronous state and between the wireless communication apparatus 100A and the wireless communication apparatus 100D in the asynchronous state. The signal A transmitted by the wireless communication apparatus 100B includes data-converted propagation information between the wireless communication apparatus 100B and the wireless communication apparatus D that is in the asynchronous state. The signal A transmitted by the wireless communication apparatus 100C includes data-converted propagation information between the wireless communication apparatus 100C and the wireless communication apparatus D that is in the asynchronous state.

(Modification 5)

In the present embodiment, it is assumed that propagation information of four wireless communication apparatuses 100A to 100D is measured and transmitted, but the present invention can be applied to any number of apparatuses as long as the number is two or more. The transmission time of the signal A or the signal C may be determined in consideration of the addition of a wireless communication apparatus (for example, wireless communication apparatuses 100E and 100F).

Figure 7:
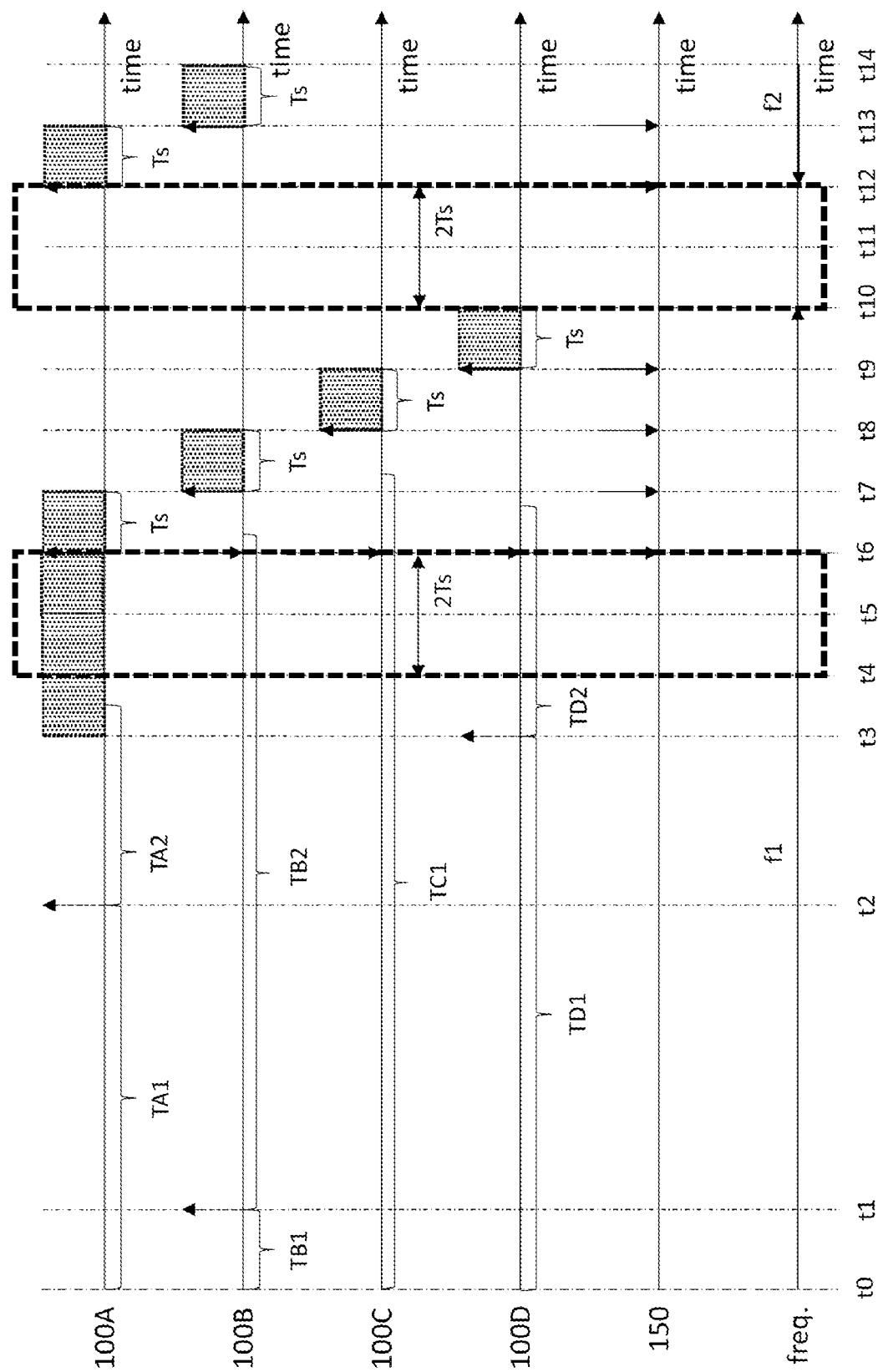
FIG. 7 is a sequence diagram of the operation of the communication system 200 in the modification.

FIG. 7 is a sequence diagram of the operation of the wireless system 200 in the present modification. Most of them are the same as those in FIG. 4, but the time from t8 to t10 is vacant. The wireless communication apparatuses 100A to 100D set an interval at which the signal A or the signal C is transmitted as the time 6 Ts in consideration of constructing the wireless system 200 with 6 wireless communication apparatuses.

The wireless communication apparatus 100A receives the signal B from wireless communication apparatus 100D at the time t3 and switches to the synchronized state. The wireless communication apparatus 100A decides to transmit signal C at time t6, which is after the time 3T from the time t3 in consideration the time slots of the wireless communication apparatuses 100D, 100E and 100F.

Thus, even when the wireless communication apparatuses 100E and 100F are added, the wireless system 200 can be continuously operated.

(Modification 6)

In FIG. 4 of the present embodiment, after the wireless communication apparatus 100A enters in the synchronous state at the time t3, the wireless communication apparatus 100A considers that the wireless communication apparatus 100D transmits the signal at the time t3, and determines to transmit the signal C at the time t4 after the time Ts from the time t3. In the modification, after the wireless communication apparatus 100A enters in the synchronous state at the time t3, the wireless communication apparatus 100A may transmit the signal C without waiting for the time Ts.

The wireless communication apparatus 100A identifies that the wireless communication apparatus 100D is in the asynchronous state because of the signal D from the wireless communication apparatus 100D. Since the wireless communication apparatus 100A transmits the signal C without waiting for the time Ts, the wireless communication apparatus 100A can reduce the possibility that other wireless communication apparatuses enter in the synchronous state while the wireless communication apparatus 100A waits for the time Ts.

(Modification 7)

In the present embodiment, switching the wireless communication apparatuses 100A to 100D from the asynchronous state to the synchronous state is described. The wireless communication apparatuses 100A to 100D may switch (reset) their own states from the synchronous state to the asynchronous state in response to a time from reception of the signal A (signal C) to reception of a next signal A (signal C).

While the wireless communication apparatuses 100A to 100D repeat transmissions of the signals A (signals C), time jitter may occur due to operations of the wireless communication apparatuses 100A to 100D themselves. A transmission (reception) time of the signal A (signal C) and a time to change the frequency band used for communication may shift because of the time jitter.

In the case of the FIG. 5, the wireless communication apparatuses 100A to 100D change the frequency band used for communication at time t12, t16, t20, . . . . When the frequency band used for communication matches between the wireless communication apparatuses 100A to 100D, the wireless communication apparatuses 100A to 100D can receive the signal A or the signal C at each time Ts.

Here, for example, a case where a changing time of the frequency band used for communication of the wireless communication apparatus 100A is shifted due to the time jitter will be described. In this case, the wireless communication apparatus 100A may communicate in a frequency band fi (fi is any one of the frequency bands f1 to fk), and the wireless communication apparatuses 100B to 100D may communicate in a frequency band fj (fj is any one of the frequency bands f1 to fk, fi≠fj). In this case, since the communication band of the wireless communication apparatus 100A and the communication band of the wireless communication apparatus 100B to 100D are different from each other, the wireless communication apparatus 100A and 100B to 100D cannot communicate each other. In the communication system 200, since a synchronization of the wireless communication apparatus 100A is substantially dissynshronized, the wireless communication apparatus 100A needs to switch (reset) its own state from the synchronous state to the asynchronous state.

The wireless communication apparatus 100A recognizes that the frequency band used for communication with the wireless communication devices 100B to 100D is shifted when a time from reception of the signal A from the wireless communication apparatuses 100B to 100D to reception of a next signal A is equal to or longer than a predetermined time. The wireless communication apparatus 100A checks its own state and switches from the synchronous state to the asynchronous state when the state of the wireless communication apparatus 100A is the synchronous state. The predetermined time is defined based on the time Ts. For example, the predetermined time may be the time Ts or may be defined based on a communication time in one or more frequency bands (time mTs×n, n is a natural number, and m is the number of wireless communication apparatuses in the communication system 200). The predetermined time is defined in relation to synchronization with the wireless communication apparatuses 100A to 100D.

In addition, the wireless communication apparatus 100A may change (reset) the frequency band used for communication to a predetermined frequency band in accordance with the switching its own state from the synchronous state to the asynchronous state. For example, the wireless communication apparatus 100A may change the frequency band used for communication to f1 in accordance with the switching its own state to the asynchronous state. The predetermined frequency band is defined in relation to synchronization with the wireless communication apparatuses 100A to 100D.

After the switching to the asynchronous state and changing the frequency band used for communication to f1, the wireless communication apparatus 100A receives the signal A from the wireless communication apparatuses 100B to 100D that return to the frequency band f1, and can enter the synchronous state again. (Modification 8)

Hereinafter, a modification in which the function of the wireless communication apparatus 100A is realized by a program will be described. The functions performed by the components of the wireless communication apparatus 100A may be realized by a processing device similar to the processor 110 processing a program. The program may be provided by being stored in a computer-readable storage medium such as a CD-ROM, a memory card, a CD-R, or a digital versatile disk (DVD) in an installable or executable file format. The program may be stored in a computer connected to a network such as the Internet and provided via the network, or may be provided by being incorporated in a storage medium such as a ROM, an HDD, or an SSD.

The modifications of the present embodiment have been described above. The wireless communication apparatuses 100A to 100D and 150 of the present embodiment communicate with the wireless communication apparatus and receive a signal A (signal C) including information indicating that a communication destination is in the synchronous state or a signal B (signal D) including information indicating that a communication destination is in the asynchronous state. The wireless communication apparatuses 100A to 100D and 150 switch their states from the asynchronous state to the synchronous state in response to reception of the signal A (signal C) or one or more signals B (signal D). It is possible to shift from the asynchronous state to the synchronous state by communication with the wireless communication apparatus of the communication destination.

Second Embodiment

Figure 8:
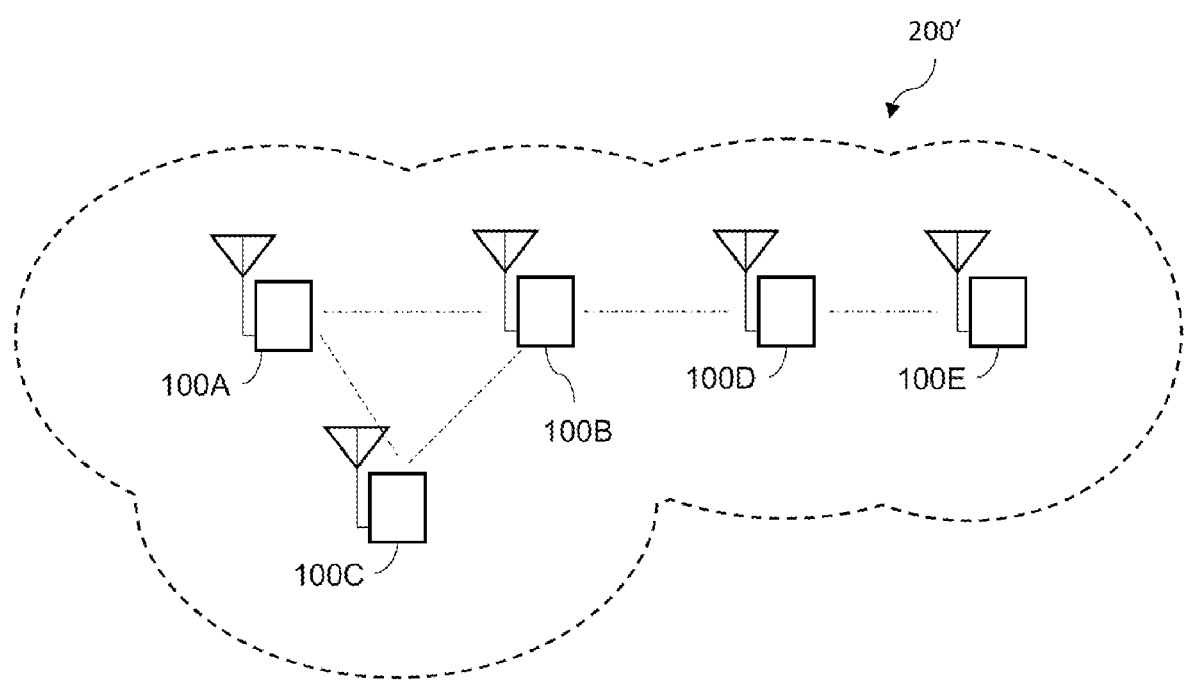
FIG. 8 is a diagram showing a communication system 200' in the second embodiment.

FIG. 8 shows a communication system 200' in the second embodiment. The communication system 200' is a communication system in which a wireless communication apparatus 100E is added to the communication system 200 in the first embodiment. Since the wireless communication apparatus 100E has the same configuration as the wireless communication apparatus 100A, the description thereof will be omitted. In FIG. 8, the wireless communication apparatus 150 is omitted.

In the communication system 200', the communicable ranges of the wireless communication apparatuses 100A to 100E are considered. Each of the wireless communication apparatuses 100A to 100E can communicate with only a part of the wireless communication apparatuses. For example, in FIG. 8, the wireless communication apparatus 100A may communicate with wireless communication apparatuses 100B and 100C. Wireless communication apparatus 100B can communicate with wireless communication apparatuses 100C and 100D in addition to wireless communication apparatus 100A. The wireless communication apparatus 100D can communicate with the wireless communication apparatus 100E in addition to the wireless communication apparatus 100B. Also in such a communication system 200', the wireless communication apparatuses 100A to 100E can be switched from the asynchronous state to the synchronous state similarly to the first embodiment.

Figure 9:
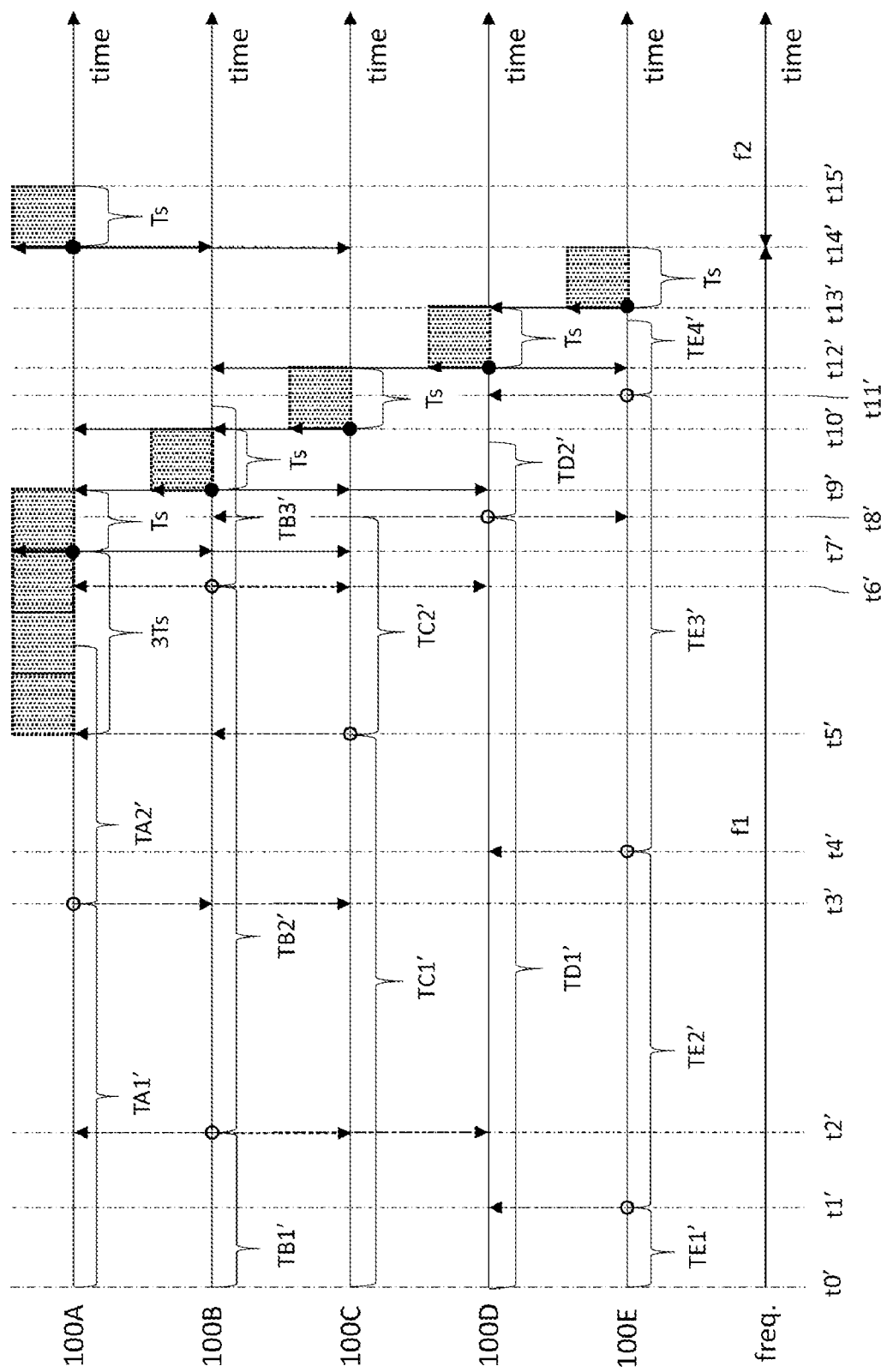
FIG. 9 is a sequence diagram of the operation of the communication system 200' in the second embodiment.

Hereinafter, an operation example of the communication system 200' will be described. FIG. 9 is a sequence diagram of the operation of the communication system 200'. FIG. 9 illustrates, as an example, a sequence diagram in a case where the wireless communication apparatuses 100A to 100E switch from the asynchronous state to the synchronous state, and the wireless communication apparatuses 100A to 100E measure and transmit propagation information with the wireless communication apparatus of the communication destination. Note that the wireless communication apparatus 150 is capable of receiving wireless signals from the wireless communication apparatuses 100A to 100E. In addition, a plurality of wireless communication apparatuses 150 may be provided at different locations, and may gather (collect) data from a corresponding wireless communication apparatus among the wireless communication apparatuses 100A to 100E, and may aggregate the data into a wired network or a cloud.

Times from t0' to t5' in FIG. 9 represent an operation of the communication system 200' until the wireless communication apparatus 100A is switched from the asynchronous state to the synchronous state. Each of the wireless communication apparatuses 100A to 100E transmits the signal B or the signal D at a random time. In FIG. 9, the wireless communication apparatus and the transmission time of the transmission source of the signal B or the signal D are represented by white circles. In addition, wireless communication apparatuses to which the signal B and the signal D are transmitted are indicated by broken line arrows.

the wireless communication apparatuses 100A to 100E attempt to receive the signal A (signal C) including information indicating that a wireless communication apparatus of a communication destination is in the synchronous state and the signal B (signal D) including information indicating that the wireless communication apparatus of the communication destination is in the asynchronous state. When receiving the signal A (signal C) or receiving the predetermined number (one or more) of the signal B (signal D), the wireless communication apparatuses 100A to 100E switch their own states from the asynchronous state to the synchronous state.

In the communication system 200', when all of the wireless communication apparatuses 100A to 100E are in the synchronized state, it is set in advance such that the signal A or the signal C is transmitted in the order of the wireless communication apparatuses 100A, 100B, 100C, 100D, and 100E. After wireless communication apparatus 100E transmits the signal A, wireless communication apparatus 100A transmits the signal C. In this case, it is desirable to switch from the asynchronous state to the synchronous state in the order of the wireless communication apparatuses 100A, 100B, 100C, 100D, and 100E. In the present embodiment, the predetermined numbers of signals B and signals D preset in the wireless communication apparatuses 100A to 100E are two in the wireless communication apparatus 100A, three in the wireless communication apparatus 100B, four in the wireless communication apparatus 100C, five in the wireless communication apparatus 100D, and six in the wireless communication apparatus 100E.

At time t0', the wireless communication apparatuses 100A to 100E perform initialization. At time t0', the wireless communication apparatuses 100A to 100E are in the asynchronous state. Each of the wireless communication apparatuses 100A to 100E determines a waiting time for waiting to transmit a signal (the signal B or the signal D) including information indicating that the wireless communication apparatus is in the asynchronous state. The wireless communication apparatus 100A determines a waiting time TA1' and determines to transmit the signal D at time t3'. Similarly, each of the wireless communication apparatuses 100B to 100E determines the waiting time. The wireless communication apparatus 100B determines a waiting time TB1' and determines to transmit the signal B at time t2'. The wireless communication apparatus 100C determines a waiting time TC1' and determines to transmit the signal B at time t5'. The wireless communication apparatus 100D determines a waiting time TD1' and determines to transmit the signal B at time t9'. The wireless communication apparatus 100E determines a waiting time TE1' and determines to transmit the signal B at time t1'.

At the time t1', wireless communication apparatus 100E transmits the signal B. The wireless communication apparatus 100D receives the signal B from the wireless communication apparatus 100E. Since the wireless communication apparatus 100D has not yet received the predetermined number of signals B, the wireless communication apparatus 100D continues to receive the wireless signal. Since the wireless communication apparatus 100E is in the asynchronous state, the wireless communication apparatus 100E determines the waiting time for transmitting the signal B again. The wireless communication apparatus 100E determines a waiting time TE2' and determines to transmit the signal B at time t4'.

At the time t2', wireless communication apparatus 100B transmits the signal B. The wireless communication apparatuses 100A, 100C, and 100D receive the signal B from the wireless communication apparatus 100B. Since the wireless communication apparatuses 100A, 100C and 100D have not yet received the predetermined number of signals B, they continue to receive a wireless signal. Since the wireless communication apparatus 100B is in the asynchronous state, since the wireless communication apparatus 100B determines a waiting time for transmitting the signal B again. The wireless communication apparatus 100B determines a waiting time TB2' and determines to transmit the signal B at time t7'.

At the time t3', wireless communication apparatus 100A transmits the signal D. The wireless communication apparatuses 100B and 100C receive the signal D. Since the wireless communication apparatuses 100B and 100C have not yet received the predetermined number of signals B and D, they continue to receive a wireless signal. Since the wireless communication apparatus 100A is in the asynchronous state, the wireless communication apparatus 100A determines a waiting time for transmitting the signal D again. The wireless communication apparatus 100A determines a waiting time TA2' and determines to transmit the signal D after the waiting time TA2' from the time t3'.

At the time t4', wireless communication apparatus 100E transmits the signal B. The wireless communication apparatus 100D receives the signal B from wireless communication apparatus 100E. Since the wireless communication apparatus 100D has not yet received the predetermined number of signals B, the wireless communication apparatus 100D continues to receive the wireless signal. Since the wireless communication apparatus 100E is in the asynchronous state, the wireless communication apparatus 100E determines the waiting time for transmitting the signal B again. The wireless communication apparatus 100E determines a waiting time TE3' and determines to transmit the signal B at time t11'.

At the time t5', wireless communication apparatus 100C transmits the signal B. The wireless communication apparatus 100A and 100B receive signal B from the wireless communication apparatus 100C. Since the wireless communication apparatus 100B has not yet received the predetermined number of signals B, the wireless communication apparatus 100B continues to receive a wireless signal. Since the wireless communication apparatus 100C is in the asynchronous state, the wireless communication apparatus 100C determines the waiting time for transmitting the signal B again. The wireless communication apparatus 100C determines a waiting time TC2' and determines to transmit the signal B after the waiting time TC2' from the time t5'.

Here, the wireless communication apparatus 100A receives two signals B. Since the wireless communication apparatus 100A has received the predetermined number of signals B, the wireless communication apparatus 100A switches own state from the asynchronous state to the synchronous state. The wireless communication apparatus 100A recognizes from the communication information of the signal B that the transmission source is the wireless communication apparatus 100C, and that a transmission time of the signal B is the time t5'. The wireless communication apparatus 100A cancels the schedule of transmitting the signal D by switching to the synchronous state, and determines a time of transmitting the signal C including the information indicating that the wireless communication apparatus A100 is in the synchronous state.

The wireless communication apparatus 100A determines the time at which the signal C is transmitted in consideration of the time slots Ts of the wireless communication apparatuses 100B to 100E. When the wireless communication apparatuses 100C to 100E are in the synchronous state, the wireless communication apparatuses 100C, 100D, 100E, and 100A transmit the signal A or the signal C in this order. The wireless communication apparatus 100A determines the time at which the signal C is transmitted as time t8. The time t8 is after time 3T' from a transmission time of the wireless signal of the wireless communication apparatus 100C. As described above, the wireless communication apparatus 100A enters the synchronous state. An operation of the communication system 200' after time t5' will be described. The wireless communication apparatus 100A transmits the signal C including information indicating that the wireless communication apparatus A100 is in the synchronous state. A wireless communication apparatus receiving the signal C switches from the asynchronous state to the synchronous state. The wireless communication apparatus switched to the synchronous state transmits the signal A. A wireless communication apparatus that has received the signal A switches from the asynchronous state to the synchronous state. In FIG. 9, a wireless communication apparatus of the transmission source of the signal A or the signal C and the transmission time are represented by black circles. In addition, wireless communication apparatuses to which the signal A and the signal C are transmitted are indicated by solid-line arrows.

Finally, the wireless communication apparatuses 100A to 100E are all switched to the synchronous state. Each of the wireless communication apparatuses 100A to 100E measures propagation information with the wireless communication apparatus of the transmission source in accordance with a reception of the signal A or the signal C. Each of the wireless communication apparatuses 100A to 100E transmits the signal A or the signal C one times, and then measures propagation information between the wireless communication apparatuses 100A to 100E and transmits the signal A or the signal C while changing a frequency band used for communication.

At the time t6', wireless communication apparatus 100B transmits the signal B. The wireless communication apparatuses 100A, 100C, and 100D receive the signal B from the wireless communication apparatus 100B. Since the wireless communication apparatuses 100C and 100D have not yet received the predetermined number of signals B, they continue to receive a wireless signal. Since the wireless communication apparatus 100B is in the asynchronous state, Since the wireless communication apparatus 100B determines a waiting time for transmitting the signal B again. The wireless communication apparatus 100B determines a waiting time TB3' and determines to transmit the signal B after the waiting time TB3' from the time t6'.

At the time t7', wireless communication signal 100A transmits the signal C. The wireless communication apparatus 100B and 100C receive the signal C from the wireless communication apparatus 100A. Since the signal C includes information that the wireless communication apparatus 100A is in the synchronous state, the wireless communication apparatuses 100B and 100C switch their states from the asynchronous state to the synchronous state. The wireless communication apparatus 100A determines to transmit the signal C at time t14' after the time 5 Ts from the time t7' in consideration of the time slot accompanying the transmission of the signal C of the wireless communication apparatus 100A and the time slots accompanying transmissions of the signals A of the wireless communication apparatuses 100B to 100E.

The wireless communication apparatuses 100B and 100C recognize that the wireless communication apparatus 100A has transmitted at the time t7 by the signal C. Each of the wireless communication apparatuses 100B and 100C cancels the schedule of transmitting the signal B by switching to the synchronous state, and determines a time of transmitting the signal A including the information that the wireless communication apparatuses 100B or 100C is in the synchronous state. In order to transmit the signal A next to the wireless communication apparatus 100A, the wireless communication apparatus 100B determines to transmit the signal A at a time t9' after the time Ts from the time t7'. In order to transmit the signal A next to the wireless communication apparatus 100B, the wireless communication apparatus 100C determines to transmit the signal A at a time t10' after the time Ts from the time t9'.

In addition, the wireless communication apparatuses 100B and 100C measure propagation information with the wireless communication apparatus 100A in the frequency band f1 in accordance with the reception of the signal C from the wireless communication apparatus 100A. The propagation information is converted into data and transmitted by the signal A.

In addition, the wireless communication apparatuses 100A to 100C determine a time at which the frequency band used for communication is changed based on the information indicating the transmission time (time t7') and the identification information of the wireless communication apparatus 100A of the transmission source included in the signal C. When all of the wireless communication apparatuses 100A to 100E are in the synchronous state, the wireless communication apparatus 100E transmits the signal A at time t13'. The time t13' is after 4 Ts from the time t7'. Further, the wireless communication apparatus 100A next transmits the signal C at time t14'. The time t14' is after 5 Ts of the time t7'. The wireless communication apparatuses 100A to 100C determine a time at which the frequency band used for communication is changed from f1 to f2 between the times t13' to t14'.

At the time t8', the wireless communication apparatus 100D transmits the signal B. The wireless communication apparatus 100B and 100E receive the signal B from the wireless communication apparatus 100D. Since the wireless communication apparatus 100E has not yet received the predetermined number of the signals B, the wireless communication apparatus 100E continues to receive a wireless signal. Since the wireless communication apparatus 100D is in the asynchronous state, the wireless communication apparatus 100D determines a waiting time for transmitting the signal B again. The wireless communication apparatus 100D determines a waiting time TD2' and determines to transmit the signal B after the waiting time TD2' from the time t8'.

At the time t9', the wireless communication apparatus 100B transmits the signal A. The wireless communication apparatuses 100A, 100C, and 100D receive the signal A from the wireless communication apparatus 100B. Since the signal A includes information that the wireless communication apparatus 100B is in the synchronous state, the wireless communication apparatus 100D switches its state from the asynchronous state to the synchronous state. The signal A also includes data-converted propagation information between the wireless communication apparatuses 100A and 100B in the frequency band f1. The wireless communication apparatus 100B decides to transmit the signal C after time 5 Ts from time t9' in consideration the time slot.

The wireless communication apparatus 100D recognizes from the communication information included in the signal A that the wireless communication apparatus 100B has transmitted the signal A. The wireless communication apparatus 100D cancels a schedule for transmitting the signal B by switching to the synchronous state, and determines a time at which the wireless communication apparatus 100D transmits the signal A including the information indicating that the wireless communication apparatus 100D is in the synchronous state. In order to transmit the signal A next to the wireless communication apparatus 100C, the wireless communication apparatus 100D determines to transmit the signal A at a time t12' after the time 2 Ts from the time t9'.

In addition, the wireless communication apparatuses 100A, 100C, and 100D measure propagation information with the wireless communication apparatus 100B in the frequency band f1 in accordance with the reception of the signal A from the wireless communication apparatus 100B. The propagation information is converted into data, and transmitted by the signal A or the signal C.

Further, the wireless communication apparatus 100D determines a time to change the frequency band used for communication based on the information indicating the transmission time (time t9') and the identification information of the wireless communication apparatus 100B of the transmission source included in the signal A from the wireless communication apparatus 100B. The wireless communication apparatus 100D determines the time at which the frequency band used for communication is changed from f1 to f2 between times t13' and t14'.

At the time t10', the wireless communication signal 100C transmits the signal A. The wireless communication apparatus 100A and 100B receive the signal A from the wireless communication apparatus 100C. The signal A includes information indicating that the wireless communication apparatus 100C is in the synchronous state, and information of data-converted propagation in the frequency band f1 between the wireless communication apparatuses 100A and 100C and between the wireless communication apparatuses 100B and 100C. The wireless communication apparatus 100C decides to transmit the signal A after time 5 Ts from time t10' in consideration of the time slot.

In addition, the wireless communication apparatuses 100A and 100B measure propagation information with the wireless communication apparatus 100C in the frequency band f1 in accordance with the reception of the signal A from the wireless communication apparatus 100C. The propagation information is converted into data, and transmitted by the signal A or the signal C.

At the time t11', the wireless communication apparatus 100E transmits the signal B. The wireless communication apparatus 100D receives the signal B from the wireless communication apparatus 100E. Since the wireless communication apparatus 100E is in the asynchronous state, the wireless communication apparatus 100E determines the waiting time for transmitting the signal B again. The wireless communication apparatus 100E determines a waiting time TE4' and determines to transmit the signal B after the waiting time TE4' from the time t11'.

At the time t12', the wireless communication apparatus 100D transmits the signal A. The wireless communication apparatus 100B and 100E receive the signal A from the wireless communication apparatus 100D. Since the signal A includes information that the wireless communication apparatus 100D is in the synchronous state, the wireless communication apparatus 100E switches its state from the asynchronous state to the synchronous state. The signal A also includes data-converted propagation information between the wireless communication apparatuses 100B and 100D in the frequency band f1. The wireless communication apparatus 100D decides to transmit the signal C after time 5 Ts from time t12' in consideration of the time slot.

The wireless communication apparatus 100E recognizes from the communication information included in the signal A that the wireless communication apparatus 100D has transmitted the signal A. The wireless communication apparatus 100E cancels the schedule for transmitting the signal B by switching to the synchronous state, and determines the time at which the wireless communication apparatus 100E transmits the signal A including the information indicating that the wireless communication apparatus 100E is in the synchronous state. In order to transmit the signal A next to the wireless communication apparatus 100D, the wireless communication apparatus 100E determines to transmit the signal A at a time t13' after the time Ts from the time t12'.

In addition, the wireless communication apparatuses 100B and 100E measure propagation information with the wireless communication apparatus 100D in the frequency band f1 in accordance with the reception of the signal A from the wireless communication apparatus 100D. The propagation information is converted into data and transmitted by the signal A.

Further, the wireless communication apparatus 100E determines a time to change the frequency band used for communication based on the information indicating the transmission time (time t12') and the identification information of the wireless communication apparatus 100D of the transmission source included in the signal A from the wireless communication apparatus 100D. The wireless communication apparatus 100E determines a time at which the frequency band used for communication is changed from f1 to f2 between times t13' and t14'.

At the time t13', the wireless communication signal 100E transmits the signal A. The wireless communication apparatus 100D receives the signal A from the wireless communication apparatus 100C. The signal A includes information indicating that the wireless communication apparatus 100C is in the synchronized state, and the data-converted propagation information of the wireless communication apparatuses 100D and 100E in the frequency band f1. The wireless communication apparatus 100E decides to transmit the signal A after time 5 Ts from time t13' in consideration of the time slot.

In addition, the wireless communication apparatus 100D measures propagation information with the wireless communication apparatus 100E in the frequency band f1 in accordance with the reception of the signal A from the wireless communication apparatus 100E. The propagation information is converted into data and transmitted by the signal A.

As described above, the wireless communication apparatuses 100A to 100E are switched from the asynchronous state to the synchronous state. Each of the wireless communication apparatuses 100A to 100E transmits the signal A or the signal C one time, and measures the propagation information in the frequency band f1. Then, measurement of propagation information in the frequency band f1 is completed. After the time t14', as in the first embodiment, the wireless communication apparatuses 100A to 100E measure the propagation information with the wireless communication apparatus of the communication destination while changing the frequency band, and transmit the data-converted propagation information. The data-converted propagation information may be gathered (collected) by the wireless communication apparatus 150 capable of communicating with the wireless communication apparatuses 100A to 100E, or may be gathered (collected) by at least one of the wireless communication apparatuses 100A to 100E.

The wireless system 200' of the present embodiment has been described above. The present embodiment is an example, and various modifications can be implemented and executed. For example, the modification of the first embodiment is applicable. The wireless communication apparatuses 100A to 100E of the present embodiment communicate with a wireless communication apparatus and receive the signal A (signal C) including information indicating that a communication destination is in the synchronous state or the signal B (signal D) including information indicating that the communication destination is in the asynchronous state. The wireless communication apparatuses 100A to 100D and 150 switch their states from the asynchronous state to the synchronous state in response to reception of the signal A (signal C) or one or more signals B (signal D). Even when the wireless communication apparatuses 100A to 100E have a limited communication range, it is possible to shift from the asynchronous state to the synchronous state by communication with the wireless communication apparatus of the communication destination.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus that is configured to communicate with a wireless apparatus, the electronic apparatus comprising:
a receiver to receive a first signal including first information in which the wireless apparatus is in a synchronous state, or a second signal including second information in which the wireless apparatus is in an asynchronous state; and
a processor configured to switch the electronic apparatus from an asynchronous state to a synchronous state in response to reception of the first signal or reception of at least one of the second signals,
wherein the processor is configured to switch the electronic apparatus from the asynchronous state to the synchronous state in response to reception of a predetermined number of second signals defined in association with the wireless apparatus.

2. The electronic apparatus according to claim 1, wherein the first signal further includes third information relating to a first time at which the wireless apparatus transmits the first signal, and identification information of the wireless apparatus.

3. The electronic apparatus according to claim 2, wherein the processor is configured to determine a second time at which a frequency band used by the receiver is changed based on the third information and the identification information.

4. The electronic apparatus according to claim 1, wherein:
the first signal further includes fourth information relating to propagation of communication between a plurality of wireless apparatuses, and
the electronic apparatus further comprises a storage to store the fourth information.

5. The electronic apparatus according to claim 1, wherein:
the processor is configured to generate a third signal including fifth information in which the electronic apparatus is in synchronization state or a fourth signal including sixth information in which the electronic apparatus is in an asynchronous state according to whether the electronic apparatus is in the synchronous state or the asynchronous state, and
the electronic apparatus further comprises a transmitter to transmit the third signal or the fourth signal.

6. The electronic apparatus according to claim 5, wherein:
the first signal further includes third information relating to a first time at which the wireless apparatus transmits the first signal, and identification information of the wireless apparatus, and
the processor is configured to determine a second time at which the transmitter transmits the third signal based on the third information and the identification information.

7. The electronic apparatus according to claim 6, wherein the processor is configured to determine the second time from the first time to a third time, and the third time is an integer multiple of a predetermined time defined in association with the synchronization with the wireless apparatus.

8. The electronic apparatus according to claim 1, wherein the processor is configured to switch the electronic apparatus from the synchronous state to the asynchronous state in response to a time from reception of the first signal to reception of a next first signal.

9. The electronic apparatus according to claim 8, wherein the processor is configured to change a frequency band used for communication by the receiver, the frequency band being defined in association with the synchronization with the wireless apparatus.

10. A system comprising:
a plurality of wireless apparatuses; and
the electronic apparatus according to claim 1,
wherein:
the receiver is configured to receive the first signal or the second signal from one of the plurality of wireless apparatuses,
the first signal includes first information in which the one of the plurality of wireless apparatuses is in a synchronous state, and
the second signal includes second information in which the one of the plurality of wireless apparatuses is in an asynchronous state.

11. An electronic apparatus that is configured to communicate with a wireless apparatus, the electronic apparatus comprising:
a receiver to receive a first signal including first information in which the wireless apparatus is in a synchronous state, or a second signal including second information in which the wireless apparatus is in an asynchronous state; and
a processor configured to switch the electronic apparatus from an asynchronous state to a synchronous state in response to reception of the first signal or reception of at least one of the second signals,
wherein the first signal further includes third information relating to a first time at which the wireless apparatus transmits the first signal, and identification information of the wireless apparatus.

12. The electronic apparatus according to claim 11, wherein the processor is configured to determine a second time at which a frequency band used by the receiver is changed based on the third information and the identification information.

13. A system comprising:
a plurality of wireless apparatuses; and
the electronic apparatus according to claim 11,
wherein:
the receiver is configured to receive the first signal or the second signal from one of the plurality of wireless apparatuses,
the first signal includes first information in which the one of the plurality of wireless apparatuses is in a synchronous state, and
the second signal includes second information in which the one of the plurality of wireless apparatuses is in an asynchronous state.

14. An electronic apparatus that is configured to communicate with a wireless apparatus, the electronic apparatus comprising:
a receiver to receive a first signal including first information in which the wireless apparatus is in a synchronous state, or a second signal including second information in which the wireless apparatus is in an asynchronous state; and
a processor configured to switch the electronic apparatus from an asynchronous state to a synchronous state in response to reception of the first signal or reception of at least one of the second signals,
wherein:
the first signal further includes fourth information relating to propagation of communication between a plurality of wireless apparatuses, and the electronic apparatus further comprises a storage to store the fourth information.

15. A system comprising:
a plurality of wireless apparatuses; and
the electronic apparatus according to claim 14,
wherein:
the receiver is configured to receive the first signal or the second signal from one of the plurality of wireless apparatuses,
the first signal includes first information in which the one of the plurality of wireless apparatuses is in a synchronous state, and
the second signal includes second information in which the one of the plurality of wireless apparatuses is in an asynchronous state.

16. An electronic apparatus that is configured to communicate with a wireless apparatus, the electronic apparatus comprising:
a receiver to receive a first signal including first information in which the wireless apparatus is in a synchronous state, or a second signal including second information in which the wireless apparatus is in an asynchronous state; and
a processor configured to switch the electronic apparatus from an asynchronous state to a synchronous state in response to reception of the first signal or reception of at least one of the second signals,
wherein:
the processor is configured to generate a third signal including fifth information in which the electronic apparatus is in synchronization state or a fourth signal including sixth information in which the electronic apparatus is in an asynchronous state according to whether the electronic apparatus is in the synchronous state or the asynchronous state,
the electronic apparatus further comprises a transmitter to transmit the third signal or the fourth signal,
the first signal further includes third information relating to a first time at which the wireless apparatus transmits the first signal, and identification information of the wireless apparatus, and
the processor is configured to determine a second time at which the transmitter transmits the third signal based on the third information and the identification information.

17. The electronic apparatus according to claim 16, wherein the processor is configured to determine the second time from the first time to a third time, and the third time is an integer multiple of a predetermined time defined in association with the synchronization with the wireless apparatus.

18. A system comprising:
a plurality of wireless apparatuses; and
the electronic apparatus according to claim 16,
wherein:
the receiver is configured to receive the first signal or the second signal from one of the plurality of wireless apparatuses,
the first signal includes first information in which the one of the plurality of wireless apparatuses is in a synchronous state, and
the second signal includes second information in which the one of the plurality of wireless apparatuses is in an asynchronous state.

19. An electronic apparatus that is configured to communicate with a wireless apparatus, the electronic apparatus comprising:
a receiver to receive a first signal including first information in which the wireless apparatus is in a synchronous state, or a second signal including second information in which the wireless apparatus is in an asynchronous state; and
a processor configured to switch the electronic apparatus from an asynchronous state to a synchronous state in response to reception of the first signal or reception of at least one of the second signals,
wherein the processor is configured to switch the electronic apparatus from the synchronous state to the asynchronous state in response to a time from reception of the first signal to reception of a next first signal.

20. The electronic apparatus according to claim 19, wherein the processor is configured to change a frequency band used for communication by the receiver, the frequency band being defined in association with the synchronization with the wireless apparatus.

21. A system comprising:
a plurality of wireless apparatuses; and
the electronic apparatus according to claim 19,
wherein:
the receiver is configured to receive the first signal or the second signal from one of the plurality of wireless apparatuses,
the first signal includes first information in which the one of the plurality of wireless apparatuses is in a synchronous state, and
the second signal includes second information in which the one of the plurality of wireless apparatuses is in an asynchronous state.

* * * * *